US009412260B2

(12) United States Patent
Kates

(10) Patent No.: US 9,412,260 B2
(45) Date of Patent: *Aug. 9, 2016

(54) CONTROLLED POWER-EFFICIENT OPERATION OF WIRELESS COMMUNICATION DEVICES

(71) Applicant: Google Inc., Mountain View, CA (US)

(72) Inventor: Lawrence Kates, Corona Del Mar, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/875,488

(22) Filed: Oct. 5, 2015

(65) Prior Publication Data

US 2016/0029315 A1 Jan. 28, 2016

Related U.S. Application Data

(60) Continuation of application No. 14/298,371, filed on Jun. 6, 2014, now Pat. No. 9,183,733, which is a continuation of application No. 14/168,876, filed on Jan. 30, 2014, which is a continuation of application No. 12/905,248, filed on Oct. 15, 2010, now abandoned, which is a continuation of application No. 12/182,079, filed on Jul. 29, 2008, now Pat. No. 7,817,031, which is a division of application No. 11/562,313, filed on Nov. 21, 2006, now Pat. No. 7,411,494, which is a continuation of application No. 10/856,231, filed on May 27, 2004, now Pat. No. 7,142,107.

(51) Int. Cl.
*G08B 17/00* (2006.01)
*G08B 25/10* (2006.01)
*G08B 1/08* (2006.01)
*G08B 25/00* (2006.01)
*G08B 17/10* (2006.01)

(Continued)

(52) U.S. Cl.
CPC .............. *G08B 25/10* (2013.01); *G06F 1/3209* (2013.01); *G08B 1/08* (2013.01); *G08B 17/00* (2013.01); *G08B 17/10* (2013.01); *G08B 21/182* (2013.01); *G08B 25/001* (2013.01); *G08B 25/007* (2013.01); *G08B 25/009* (2013.01); *H04Q 9/02* (2013.01); *H04W 52/0225* (2013.01); *H04W 84/18* (2013.01); *Y02B 60/50* (2013.01)

(58) Field of Classification Search
USPC .......................................... 340/540, 584, 628
See application file for complete search history.

(56) References Cited

U.S. PATENT DOCUMENTS 2,101,637 A 12/1937 Davis
2,233,297 A 2/1941 Polin et al.
(Continued)

FOREIGN PATENT DOCUMENTS

CN 2388660 Y 7/2000
DE 3415786 A1 11/1984
(Continued)

OTHER PUBLICATIONS

Bourke, T. (2001). *Server Load Balancing.* Sebastopol, California: O'Reilly & Associates, Inc., 182 pages.

(Continued)

*Primary Examiner* — Ojiako Nwugo
(74) *Attorney, Agent, or Firm* — Wolfe-SBMC

(57) ABSTRACT

A low cost, robust, wireless sensor that provides an extended period of operability without maintenance is described. The wireless sensors are configured to communicate with a base unit or repeater. When the sensor unit detects an anomalous ambient condition (e.g., smoke, fire, water, etc.) the sensor communicates with the base unit and provides data regarding the anomalous condition. The sensor unit receives instructions to change operating parameters and/or control external devices.

99 Claims, 8 Drawing Sheets

(51) Int. Cl.

| | |
|---|---|
| G06F 1/32 | (2006.01) |
| H04Q 9/02 | (2006.01) |
| G08B 21/18 | (2006.01) |
| H04W 52/02 | (2009.01) |
| H04W 84/18 | (2009.01) |

(56) References Cited

U.S. PATENT DOCUMENTS

| | | | |
|---|---|---|---|
| 4,056,780 A | 11/1977 | Faulkner | |
| 4,061,442 A | 12/1977 | Clark et al. | |
| 4,099,168 A | 7/1978 | Kedjierski et al. | |
| 4,136,823 A | 1/1979 | Kullberg | |
| 4,226,533 A | 10/1980 | Snowman | |
| 4,266,220 A | 5/1981 | Malinowski | |
| 4,400,694 A | 8/1983 | Wong et al. | |
| 4,420,746 A | 12/1983 | Malinowski | |
| 4,437,336 A | 3/1984 | Abe | |
| 4,455,553 A | 6/1984 | Johnson | |
| 4,514,720 A | 4/1985 | Oberstein et al. | |
| 4,535,450 A | 8/1985 | Tan | |
| 4,543,570 A | 9/1985 | Bressert et al. | |
| 4,556,873 A | 12/1985 | Yamada et al. | |
| 4,652,859 A | 3/1987 | Van Wienen | |
| 4,661,804 A | 4/1987 | Abel | |
| 4,670,739 A | 6/1987 | Kelly, Jr. | |
| 4,675,661 A | 6/1987 | Ishii | |
| 4,692,742 A | 9/1987 | Raizen et al. | |
| 4,692,750 A | 9/1987 | Murakami et al. | |
| 4,727,359 A | 2/1988 | Yuchi et al. | |
| 4,772,876 A | 9/1988 | Laud | |
| 4,801,865 A | 1/1989 | Miller et al. | |
| 4,811,011 A | 3/1989 | Sollinger | |
| 4,817,131 A | 3/1989 | Thornborough et al. | |
| 4,827,244 A | 5/1989 | Bellavia et al. | |
| 4,857,895 A | 8/1989 | Kaprelian | |
| 4,862,514 A | 8/1989 | Kedjierski | |
| 4,871,999 A | 10/1989 | Ishii et al. | |
| 4,901,316 A | 2/1990 | Igarashi et al. | |
| 4,916,432 A | 4/1990 | Tice et al. | |
| 4,939,504 A | 7/1990 | Miller | |
| 4,951,029 A | 8/1990 | Severson | |
| 4,977,527 A | 12/1990 | Shaw et al. | |
| 4,996,518 A | 2/1991 | Takahashi et al. | |
| 5,107,446 A | 4/1992 | Shaw et al. | |
| 5,134,644 A | 7/1992 | Garton et al. | |
| 5,138,562 A | 8/1992 | Shaw et al. | |
| 5,151,683 A | 9/1992 | Takahashi et al. | |
| 5,159,315 A | 10/1992 | Schultz et al. | |
| 5,168,262 A | 12/1992 | Okayama | |
| 5,188,143 A | 2/1993 | Krebs | |
| 5,201,061 A | 4/1993 | Goldberg et al. | |
| 5,224,648 A | 7/1993 | Simon et al. | |
| 5,229,750 A | 7/1993 | Welch, Jr. et al. | |
| 5,240,022 A | 8/1993 | Franklin | |
| 5,260,687 A | 11/1993 | Yamauchi et al. | |
| 5,267,180 A | 11/1993 | Okayama | |
| 5,281,951 A | 1/1994 | Okayama | |
| 5,315,291 A | 5/1994 | Furr | |
| 5,319,698 A | 6/1994 | Glidewell et al. | |
| 5,335,186 A | 8/1994 | Tarrant | |
| 5,345,224 A | 9/1994 | Brown | |
| 5,357,241 A | 10/1994 | Welch, Jr. | |
| 5,400,246 A | 3/1995 | Wilson et al. | |
| 5,408,223 A | 4/1995 | Guillemot | |
| 5,430,433 A | 7/1995 | Shima | |
| 5,432,500 A | 7/1995 | Scripps | |
| 5,530,433 A | 6/1996 | Morita | |
| 5,564,626 A | 10/1996 | Kettler et al. | |
| 5,568,121 A | 10/1996 | Lamensdorf | |
| 5,574,435 A | 11/1996 | Mochizuki | |
| 5,627,515 A | 5/1997 | Anderson | |
| 5,655,561 A | 8/1997 | Wendel et al. | |
| 5,719,556 A | 2/1998 | Albin et al. | |
| 5,723,848 A | 3/1998 | Bilenko et al. | |
| 5,736,928 A | 4/1998 | Tice et al. | |
| 5,748,092 A | 5/1998 | Arsenault et al. | |
| 5,854,994 A | 12/1998 | Canada et al. | |
| 5,859,536 A | 1/1999 | Stockton | |
| 5,881,951 A | 3/1999 | Carpenter | |
| 5,889,468 A | 3/1999 | Banga | |
| 5,892,758 A | 4/1999 | Argyroudis | |
| 5,898,374 A | 4/1999 | Schepka | |
| 5,907,491 A | 5/1999 | Canada et al. | |
| 5,914,656 A | 6/1999 | Ojala et al. | |
| 5,923,102 A | 7/1999 | Koenig et al. | |
| 5,949,332 A | 9/1999 | Kim | |
| 5,959,529 A | 9/1999 | Kail, IV | |
| 6,023,476 A | 2/2000 | Lo | |
| 6,025,788 A | 2/2000 | Diduck | |
| 6,031,455 A | 2/2000 | Grube et al. | |
| 6,049,273 A * | 4/2000 | Hess | G08B 7/06 340/331 |
| 6,060,994 A | 5/2000 | Chen | |
| 6,072,784 A | 6/2000 | Agrawal et al. | |
| 6,075,451 A | 6/2000 | Lebowitz et al. | |
| 6,078,050 A | 6/2000 | Castleman | |
| 6,078,269 A | 6/2000 | Markwell et al. | |
| 6,084,522 A | 7/2000 | Addy | |
| 6,097,288 A | 8/2000 | Koeppe, Jr. | |
| 6,111,511 A | 8/2000 | Sivathanu et al. | |
| 6,124,806 A | 9/2000 | Cunningham et al. | |
| 6,157,307 A | 12/2000 | Hardin | |
| 6,175,310 B1 | 1/2001 | Gott | |
| 6,208,247 B1 | 3/2001 | Agre et al. | |
| 6,215,404 B1 | 4/2001 | Morales | |
| 6,281,840 B1 | 8/2001 | Miyoshi et al. | |
| 6,313,646 B1 | 11/2001 | Davis et al. | |
| 6,320,501 B1 | 11/2001 | Tice et al. | |
| 6,366,217 B1 | 4/2002 | Cunningham et al. | |
| 6,369,714 B2 | 4/2002 | Walter | |
| 6,377,181 B1 | 4/2002 | Kroll et al. | |
| 6,380,860 B1 * | 4/2002 | Goetz | G08B 25/10 340/539.1 |
| 6,388,399 B1 | 5/2002 | Eckel et al. | |
| 6,420,973 B2 | 7/2002 | Acevedo | |
| 6,421,731 B1 | 7/2002 | Ciotti et al. | |
| 6,437,692 B1 | 8/2002 | Petite et al. | |
| 6,441,731 B1 | 8/2002 | Hess | |
| 6,445,292 B1 | 9/2002 | Jen et al. | |
| 6,452,493 B1 | 9/2002 | Ma et al. | |
| 6,453,687 B2 | 9/2002 | Sharood et al. | |
| 6,489,895 B1 | 12/2002 | Apelman | |
| 6,515,283 B1 | 2/2003 | Castleman et al. | |
| 6,519,509 B1 | 2/2003 | Nierlich et al. | |
| 6,526,807 B1 | 3/2003 | Doumit et al. | |
| 6,535,110 B1 | 3/2003 | Arora et al. | |
| 6,552,647 B1 | 4/2003 | Thiessen et al. | |
| 6,553,336 B1 | 4/2003 | Johnson et al. | |
| 6,583,720 B1 | 6/2003 | Quigley | |
| 6,601,016 B1 | 7/2003 | Brown et al. | |
| 6,615,658 B2 | 9/2003 | Snelling | |
| 6,619,055 B1 | 9/2003 | Addy | |
| 6,624,750 B1 * | 9/2003 | Marman | G08B 25/003 340/4.3 |
| 6,639,517 B1 | 10/2003 | Chapman et al. | |
| 6,666,086 B2 | 12/2003 | Colman et al. | |
| 6,679,400 B1 | 1/2004 | Goodman | |
| 6,690,657 B1 | 2/2004 | Lau et al. | |
| 6,704,681 B1 | 3/2004 | Nassof et al. | |
| 6,714,977 B1 | 3/2004 | Fowler et al. | |
| 6,731,215 B2 | 5/2004 | Harms et al. | |
| 6,735,630 B1 | 5/2004 | Gelvin et al. | |
| 6,748,804 B1 | 6/2004 | Lisec et al. | |
| 6,759,956 B2 | 7/2004 | Menard et al. | |
| 6,789,220 B1 | 9/2004 | Lovejoy | |
| 6,789,739 B2 | 9/2004 | Rosen | |
| 6,796,187 B2 | 9/2004 | Srinivasan et al. | |
| 6,798,220 B1 | 9/2004 | Flanigan et al. | |
| 6,798,341 B1 | 9/2004 | Eckel et al. | |
| 6,803,728 B2 | 10/2004 | Balasubramaniam et al. | |
| 6,825,777 B2 | 11/2004 | Vock et al. | |
| 6,826,948 B1 | 12/2004 | Bhatti et al. | |
| 6,851,621 B1 | 2/2005 | Wacker et al. | |
| 6,891,470 B2 | 5/2005 | Bohinc, Jr. | |

(56) References Cited

U.S. PATENT DOCUMENTS

| | | | |
|---|---|---|---|
| 6,891,838 B1 | 5/2005 | Petite et al. | |
| 6,892,751 B2 | 5/2005 | Sanders | |
| 6,909,921 B1 | 6/2005 | Bilger | |
| 6,930,596 B2 | 8/2005 | Kulesz et al. | |
| 6,935,570 B2 | 8/2005 | Acker | |
| 6,940,403 B2 | 9/2005 | Kail, IV | |
| 6,965,314 B2 | 11/2005 | Bohinc, Jr. | |
| 6,995,676 B2 | 2/2006 | Amacher | |
| 7,042,352 B2 | 5/2006 | Kates | |
| 7,055,759 B2 | 6/2006 | Wacker et al. | |
| 7,102,504 B2 | 9/2006 | Kates | |
| 7,102,505 B2 | 9/2006 | Kates | |
| 7,109,879 B2 | 9/2006 | Stults et al. | |
| 7,135,965 B2 | 11/2006 | Chapman, Jr. et al. | |
| 7,142,107 B2 | 11/2006 | Kates | |
| 7,142,123 B1 | 11/2006 | Kates | |
| 7,218,237 B2 | 5/2007 | Kates | |
| 7,221,260 B2 | 5/2007 | Berezowski | |
| 7,228,726 B2 | 6/2007 | Kates | |
| 7,230,528 B2 | 6/2007 | Kates | |
| 7,289,761 B2 | 10/2007 | Mazar | |
| 7,336,168 B2 | 2/2008 | Kates | |
| 7,348,875 B2 | 3/2008 | Hughes et al. | |
| 7,411,494 B2 | 8/2008 | Kates | |
| 7,412,876 B2 | 8/2008 | Kates | |
| 7,434,742 B2 | 10/2008 | Mueller et al. | |
| 7,460,690 B2 | 12/2008 | Cohen et al. | |
| 7,469,550 B2 | 12/2008 | Chapman, Jr. et al. | |
| 7,528,711 B2 | 5/2009 | Kates | |
| 7,561,057 B2 | 7/2009 | Kates | |
| 7,571,865 B2 | 8/2009 | Nicodem et al. | |
| 7,579,945 B1 | 8/2009 | Richter et al. | |
| 7,583,198 B2 | 9/2009 | Kates | |
| 7,623,028 B2 | 11/2009 | Kates | |
| 7,626,508 B2 | 12/2009 | Kosuge et al. | |
| 7,703,694 B2 | 4/2010 | Mueller et al. | |
| D614,976 S | 5/2010 | Skafdrup et al. | |
| 7,735,118 B2 | 6/2010 | Brok et al. | |
| 7,817,031 B2 | 10/2010 | Kates | |
| 7,837,958 B2 | 11/2010 | Crapser et al. | |
| 7,904,209 B2 | 3/2011 | Podgorny et al. | |
| 7,975,292 B2 | 7/2011 | Corella | |
| 7,994,928 B2 | 8/2011 | Richmond | |
| 8,016,205 B2 | 9/2011 | Drew | |
| 8,037,022 B2 | 10/2011 | Rahman et al. | |
| 8,098,166 B2 | 1/2012 | Lang | |
| 8,228,183 B2 | 7/2012 | Glenn et al. | |
| 8,234,694 B2 | 7/2012 | Youn et al. | |
| 8,255,090 B2 | 8/2012 | Frader-Thompson et al. | |
| 9,183,733 B2 | 11/2015 | Kates | |
| 9,286,787 B2 | 3/2016 | Kates | |
| 9,286,788 B2 | 3/2016 | Kates | |
| 9,318,015 B2 | 4/2016 | Kates | |
| 9,357,490 B2 | 5/2016 | Kates | |
| 2002/0005707 A1 | 1/2002 | Kerai et al. | |
| 2002/0011570 A1 | 1/2002 | Castleman | |
| 2002/0011923 A1* | 1/2002 | Cunningham | H04B 3/542 340/12.32 |
| 2002/0030592 A1 | 3/2002 | Hakanen et al. | |
| 2002/0033759 A1 | 3/2002 | Morello | |
| 2002/0075145 A1 | 6/2002 | Hardman et al. | |
| 2002/0084414 A1 | 7/2002 | Baker et al. | |
| 2002/0124169 A1 | 9/2002 | Agrawal et al. | |
| 2002/0158775 A1 | 10/2002 | Wallace | |
| 2002/0186141 A1 | 12/2002 | Jen et al. | |
| 2003/0011428 A1 | 1/2003 | Yamakawa et al. | |
| 2003/0011482 A1 | 1/2003 | Harms et al. | |
| 2003/0037125 A1 | 2/2003 | Luman et al. | |
| 2003/0043763 A1 | 3/2003 | Grayson | |
| 2003/0058093 A1 | 3/2003 | Dohi et al. | |
| 2003/0114898 A1 | 6/2003 | Von Arx et al. | |
| 2003/0122677 A1 | 7/2003 | Kail, IV | |
| 2003/0146833 A1 | 8/2003 | Johnston et al. | |
| 2003/0151513 A1 | 8/2003 | Herrmann et al. | |
| 2003/0162504 A1 | 8/2003 | Sabongi et al. | |
| 2003/0189948 A1 | 10/2003 | Sashihara | |
| 2003/0199247 A1 | 10/2003 | Striemer | |
| 2003/0214400 A1 | 11/2003 | Mizutani et al. | |
| 2003/0220075 A1 | 11/2003 | Baker et al. | |
| 2003/0228846 A1 | 12/2003 | Berliner et al. | |
| 2003/0231001 A1 | 12/2003 | Bruning | |
| 2004/0007264 A1 | 1/2004 | Bootka | |
| 2004/0019783 A1 | 1/2004 | Hawkes | |
| 2004/0050429 A1 | 3/2004 | Aylward et al. | |
| 2004/0062224 A1 | 4/2004 | Brownrigg et al. | |
| 2004/0090329 A1 | 5/2004 | Hitt | |
| 2004/0090924 A1 | 5/2004 | Giaimo et al. | |
| 2004/0164238 A1 | 8/2004 | Xu et al. | |
| 2004/0176028 A1 | 9/2004 | Dibernardo | |
| 2004/0181693 A1 | 9/2004 | Milliot et al. | |
| 2004/0193876 A1 | 9/2004 | Donley et al. | |
| 2004/0217858 A1 | 11/2004 | Ingley et al. | |
| 2004/0224631 A1 | 11/2004 | Davis et al. | |
| 2004/0233855 A1 | 11/2004 | Gutierrez et al. | |
| 2004/0233874 A1 | 11/2004 | Baker | |
| 2005/0012601 A1 | 1/2005 | Matsubara et al. | |
| 2005/0035877 A1 | 2/2005 | Kim | |
| 2005/0043907 A1 | 2/2005 | Eckel et al. | |
| 2005/0046563 A1* | 3/2005 | Whitney | A62C 2/24 340/506 |
| 2005/0053063 A1 | 3/2005 | Madhavan | |
| 2005/0062605 A1* | 3/2005 | Sutphin | G08B 25/012 340/539.26 |
| 2005/0088299 A1 | 4/2005 | Bandy | |
| 2005/0105841 A1 | 5/2005 | Luo et al. | |
| 2005/0116667 A1 | 6/2005 | Mueller et al. | |
| 2005/0125083 A1 | 6/2005 | Kiko | |
| 2005/0128067 A1 | 6/2005 | Zakrewski | |
| 2005/0131652 A1 | 6/2005 | Corwin et al. | |
| 2005/0187867 A1 | 8/2005 | Sokolic et al. | |
| 2005/0194456 A1 | 9/2005 | Tessier et al. | |
| 2005/0200475 A1 | 9/2005 | Chen | |
| 2005/0228991 A1 | 10/2005 | Schmit | |
| 2005/0246408 A1 | 11/2005 | Chung | |
| 2005/0258974 A1 | 11/2005 | Mahowald | |
| 2005/0262923 A1 | 12/2005 | Kates | |
| 2005/0270151 A1 | 12/2005 | Winick | |
| 2005/0275527 A1 | 12/2005 | Kates | |
| 2005/0275528 A1 | 12/2005 | Kates | |
| 2005/0275529 A1 | 12/2005 | Kates | |
| 2005/0275530 A1 | 12/2005 | Kates | |
| 2005/0275547 A1 | 12/2005 | Kates | |
| 2006/0007008 A1 | 1/2006 | Kates | |
| 2006/0032379 A1 | 2/2006 | Kates | |
| 2006/0041680 A1 | 2/2006 | Proctor et al. | |
| 2006/0059977 A1 | 3/2006 | Kates | |
| 2006/0063484 A1 | 3/2006 | Proctor et al. | |
| 2006/0068832 A1 | 3/2006 | Islam et al. | |
| 2006/0098592 A1 | 5/2006 | Proctor et al. | |
| 2006/0147003 A1 | 7/2006 | Archacki et al. | |
| 2006/0164257 A1 | 7/2006 | Giubbini | |
| 2006/0206273 A1 | 9/2006 | Reichel et al. | |
| 2006/0208099 A1 | 9/2006 | Chapman et al. | |
| 2006/0256756 A1 | 11/2006 | Wakabayashi | |
| 2006/0267756 A1 | 11/2006 | Kates | |
| 2006/0273896 A1 | 12/2006 | Kates | |
| 2007/0038787 A1 | 2/2007 | Harris et al. | |
| 2007/0040673 A1 | 2/2007 | Bohine, Jr. | |
| 2007/0043478 A1 | 2/2007 | Ehlers et al. | |
| 2007/0063833 A1 | 3/2007 | Kates | |
| 2007/0090946 A1 | 4/2007 | Kates | |
| 2007/0114295 A1 | 5/2007 | Jenkins | |
| 2007/0115902 A1 | 5/2007 | Shamoon et al. | |
| 2007/0139183 A1 | 6/2007 | Kates | |
| 2007/0211076 A1 | 9/2007 | Kates | |
| 2007/0229237 A1 | 10/2007 | Kates | |
| 2007/0234784 A1 | 10/2007 | Kates | |
| 2007/0266575 A1 | 11/2007 | Nash | |
| 2008/0015742 A1 | 1/2008 | Kulyk et al. | |
| 2008/0099568 A1 | 5/2008 | Nicodem et al. | |
| 2008/0141754 A1 | 6/2008 | Kates | |
| 2008/0221737 A1 | 9/2008 | Josephson et al. | |
| 2008/0228904 A1* | 9/2008 | Crespo-Dubie | H04L 12/2803 709/223 |

(56) References Cited

U.S. PATENT DOCUMENTS

| | | | |
|---|---|---|---|
| 2008/0278310 A1 | 11/2008 | Kates |
| 2008/0278315 A1 | 11/2008 | Kates |
| 2008/0278316 A1 | 11/2008 | Kates |
| 2008/0278342 A1 | 11/2008 | Kates |
| 2008/0284590 A1 | 11/2008 | Kates |
| 2008/0302172 A1 | 12/2008 | Kates |
| 2008/0303654 A1 | 12/2008 | Kates |
| 2009/0057427 A1 | 3/2009 | Geadelmann et al. |
| 2009/0143918 A1 | 6/2009 | Amundson et al. |
| 2009/0153336 A1 | 6/2009 | Kates |
| 2009/0194601 A1 | 8/2009 | Flohr |
| 2010/0058450 A1 | 3/2010 | Fein et al. |
| 2010/0156608 A1 | 6/2010 | Bae et al. |
| 2010/0163633 A1 | 7/2010 | Barrett et al. |
| 2010/0168924 A1 | 7/2010 | Tessier et al. |
| 2010/0199086 A1 | 8/2010 | Kuang et al. |
| 2010/0238036 A1 | 9/2010 | Holcombe |
| 2011/0001812 A1 | 1/2011 | Kang et al. |
| 2011/0025501 A1 | 2/2011 | Kates |
| 2011/0078675 A1 | 3/2011 | Van Camp et al. |
| 2011/0119747 A1 | 5/2011 | Lambiase |
| 2011/0151837 A1 | 6/2011 | Winbush, III |
| 2011/0282937 A1 | 11/2011 | Deshpande et al. |
| 2014/0203943 A1 | 7/2014 | Kates |
| 2014/0285336 A1 | 9/2014 | Kates |
| 2014/0333423 A1 | 11/2014 | Kates |
| 2014/0333434 A1 | 11/2014 | Kates |
| 2015/0061868 A1 | 3/2015 | Kates |
| 2015/0061892 A1 | 3/2015 | Kates |
| 2015/0070192 A1 | 3/2015 | Kates |

FOREIGN PATENT DOCUMENTS

| | | | |
|---|---|---|---|
| EP | 0070449 A1 | 7/1982 |
| EP | 0093463 A1 | 4/1983 |
| EP | 0346152 A2 | 12/1989 |
| EP | 0346152 A3 | 12/1989 |
| EP | 0441999 A1 | 8/1991 |
| EP | 0580298 A2 | 1/1997 |
| EP | 0930492 A1 | 7/1999 |
| GB | 231458 | 1/1926 |
| GB | 2278471 A | 11/1994 |
| JP | 9298780 | 11/1997 |
| JP | 10258189 | 9/1998 |
| WO | 98/10393 A1 | 3/1998 |
| WO | 00/21047 A1 | 4/2000 |
| WO | 00/55825 A1 | 9/2000 |
| WO | 03/009631 A1 | 1/2003 |
| WO | 2004/010398 A1 | 1/2004 |
| WO | 2004/073326 A2 | 8/2004 |
| WO | 2004/100763 A2 | 11/2004 |
| WO | 2005/010837 A2 | 2/2005 |
| WO | 2008/054938 | 5/2008 |

OTHER PUBLICATIONS

First Alert. (2007). *User's Manual Smoke and Fire Alarm: Battery Powered Photoelectric Smoke Alarm with Silence and Escape Light: Model SA720* [Brochure]. Mexico: First Alert, 6 pages.

GE General Eastern Instruments. *G-Cap™ 2 Relative Humidity Sensor* [Brochure]. GlobalSpec.com. Retrieved from the Internet: <URL: http://www.globalspec.com/FeaturedProducts/Detaii?ExhibitiD=1454> on Jun. 18, 2004, 2 pages.

Gira. *Installation and user manual: Smoke alarm device Dual/VdS* [Brochure]. Radevormwald, Germany: GIRA. Retrieved from the Internet: <URL: http://download.gira.de/data2/23301210.pdf> on Apr. 18, 2013.

Gira. *Gira Dua/VdS smoke alarm: Double safety by measuring heat and scattered light.* [Brochure]. Radevormwald, Germany: GIRA. Retrieved from the Internet: <URL: http://www.gira.de/gebaeudetechnik/produkte/sicherheit/rauchmelder/rauchwarnmelderdualvds.html> on Apr. 18, 2013, 14 pages.

Gira. *Gira Dual/VdS smoke alarm, exploded view.* [Brochure]. Radevormwald, Germany: GIRA. Retrieved from the Internet: <URL: http:/ /www.gira .de/gebaeudetechn ik/produkte/sicherheit/rauchmelder/rauchwarn melderdualvds. html?vid = 1145> on Apr. 18, 2013, 7 pages.

Indoor Health Products, Inc. (2001-2002). *Best Way to Control Indoor Molds, Dust Mites, and other Microorganisms: Measuring and Controlling Indoor Humidity* [Brochure]. Layton, Utah: Indoor Health Products, Inc. Retrieved from the Internet: <URL: http://www.relative-humidity-sensor.com> on Jun. 18, 2004, 3 pages.

Indoor Health Products, Inc. (2002). *Relative Humidity Information* [Brochure]. Layton, Utah: Indoor Health Products, Inc. Retrieved from the Internet: <URL: http://www.relative-humidity-sensor.com/relative-humidity.html> on Jun. 18, 2004, 6 pages.

Kidde. (2009). *Battery Operated Smoke Alarm with Hush: Model i9060* [Brochure]. Mebane, North Carolina: Kidde, 2 pages.

Michell Instruments Ltd. *Impedance Moisture Sensor Technology* [Brochure]. Retrieved from the Internet: <URL: http://www.sensorland.com/HowPage029.html> on Jun. 18, 2004, 2 pages.

Texas Instruments, Inc. (1996). *Mechanical Data Sheet: PT (S-PQFP-G48) Plastic Quad Flatpack,* [Brochure]. Dallas, Texas: Texas Instruments, Inc., 2 pages.

Texas Instruments, Inc. (2001-2003). *TRF6901 Single-Chip RF Transceiver Product Catalog* [Brochure]. Dallas, Texas: Texas Instruments, Inc., 27 pages.

Toxic Black Mold Information Center. (20002). *Ways to Prevent Mold Problems* [Brochure]. Layton, Utah: Toxic Black Mold Information Center. Retrieved from the Internet: <URL: http://www.toxic-black-mold-info.com/prevent.html> on Jun. 18, 2004, 12 pages.

White, et al., "A Conceptual Model for Simulation Load Balancing", Proc. 1998 Spring Simulation Interoperability Workshop (1998): 7 pages.

Winland Electronics, Inc. (2011). *Waterbug: Electronic water detection at its best*! [Brochure]. Mankato, Minnesota: Winland Electronics Inc. Retrieved from the Internet: <URL: www.winland.com>, 1 page.

"Advisory Action", U.S. Appl. No. 14/168,876, Jun. 10, 2015, 3 pages.

"Advisory Action", U.S. Appl. No. 14/536,108, Sep. 3, 2015, 4 pages.

"Final Office Action", U.S. Appl. No. 10/856,395, Apr. 13, 2006, 8 pages.

"Final Office Action", U.S. Appl. No. 10/856,395, Oct. 30, 2006, 10 pages.

"Final Office Action", U.S. Appl. No. 11/314,807, Apr. 1, 2008, 5 pages.

"Final Office Action", U.S. Appl. No. 11/314,807, Jul. 16, 2007, 5 pages.

"Final Office Action", U.S. Appl. No. 11/562,352, Aug. 21, 2008, 14 pages.

"Final Office Action", U.S. Appl. No. 12/036,915, Jul. 8, 2009, 5 pages.

"Final Office Action", U.S. Appl. No. 14/168,876, Mar. 18, 2015, 10 pages.

"Final Office Action", U.S. Appl. No. 14/298,371, Mar. 6, 2015, 17 pages.

"Final Office Action", U.S. Appl. No. 14/338,592, May 29, 2015, 22 pages.

"Final Office Action", U.S. Appl. No. 14/339,234, Aug. 20, 2015, 12 pages.

"Final Office Action", U.S. Appl. No. 14/534,848, Nov. 23, 2015, 13 pages.

"Final Office Action", U.S. Appl. No. 14/536,108, May 26, 2015, 18 pages.

"Final Office Action", U.S. Appl. No. 14/548,137, Sep. 1, 2015, 13 pages.

"First Action Interview Office Action", U.S. Appl. No. 14/338,592, Mar. 24, 2015, 4 pages.

"First Action Interview Office Action", U.S. Appl. No. 14/339,234, Mar. 24, 2015, 8 pages.

"Non-Final Office Action", U.S. Appl. No. 10/856,231, Apr. 5, 2006, 4 pages.

"Non-Final Office Action", U.S. Appl. No. 10/856,231, Dec. 21, 2005, 8 pages.

(56) References Cited

OTHER PUBLICATIONS

"Non-Final Office Action", U.S. Appl. No. 10/856,387, Dec. 14, 2005, 9 pages.
"Non-Final Office Action", U.S. Appl. No. 10/856,390, Dec. 15, 2005, 8 pages.
"Non-Final Office Action", U.S. Appl. No. 10/856,395, Oct. 3, 2005, 6 pages.
"Non-Final Office Action", U.S. Appl. No. 10/856,717, May 31, 2006, 7 pages.
"Non-Final Office Action", U.S. Appl. No. 10/856,717, Dec. 14, 2005, 7 pages.
"Non-Final Office Action", U.S. Appl. No. 10/948,628, Sep. 8, 2006, 14 pages.
"Non-Final Office Action", U.S. Appl. No. 11/145,880, Mar. 1, 2007, 4 pages.
"Non-Final Office Action", U.S. Appl. No. 11/145,880, Apr. 27, 2006, 4 pages.
"Non-Final Office Action", U.S. Appl. No. 11/216,225, Mar. 4, 2008, 10 pages.
"Non-Final Office Action", U.S. Appl. No. 11/216,225, Jul. 10, 2008, 6 pages.
"Non-Final Office Action", U.S. Appl. No. 11/231,321, Jul. 24, 2006, 8 pages.
"Non-Final Office Action", U.S. Appl. No. 11/233,931, Jul. 10, 2006, 9 pages.
"Non-Final Office Action", U.S. Appl. No. 11/314,807, Jan. 18, 2007, 5 pages.
"Non-Final Office Action", U.S. Appl. No. 11/494,988, Mar. 5, 2009, 7 pages.
"Non-Final Office Action", U.S. Appl. No. 11/562,313, Sep. 5, 2007, 5 pages.
"Non-Final Office Action", U.S. Appl. No. 11/562,352, Jan. 14, 2008, 5 pages.
"Non-Final Office Action", U.S. Appl. No. 11/748,388, Dec. 17, 2008, 5 pages.
"Non-Final Office Action", U.S. Appl. No. 11/761,760, Jan. 16, 2008, 15 pages.
"Non-Final Office Action", U.S. Appl. No. 12/036,915, Oct. 8, 2008, 6 pages.
"Non-Final Office Action", U.S. Appl. No. 12/182,079, Feb. 26, 2010, 7 pages.
"Non-Final Office Action", U.S. Appl. No. 12/905,248, Aug. 30, 2013, 20 pages.
"Non-Final Office Action", U.S. Appl. No. 14/168,876, Sep. 15, 2014, 9 pages.
"Non-Final Office Action", U.S. Appl. No. 14/298,371, Sep. 9, 2014, 9 pages.
"Non-Final Office Action", U.S. Appl. No. 14/338,592, Mar. 2, 2015, 12 pages.
"Non-Final Office Action", U.S. Appl. No. 14/534,848, Jun. 1, 2015, 19 pages.
"Non-Final Office Action", U.S. Appl. No. 14/536,108, Dec. 3, 2015, 17 pages.
"Notice of Allowance", U.S. Appl. No. 10/856,170, Dec. 13, 2005, 7 pages.
"Notice of Allowance", U.S. Appl. No. 10/856,231, Jun. 28, 2006, 4 pages.
"Notice of Allowance", U.S. Appl. No. 10/856,387, Jun. 23, 2006, 6 pages.
"Notice of Allowance", U.S. Appl. No. 10/856,390, Jun. 27, 2006, 7 pages.
"Notice of Allowance", U.S. Appl. No. 10/856,717, Mar. 13, 2007, 6 pages.
"Notice of Allowance", U.S. Appl. No. 10/948,628, Apr. 9, 2007, 6 pages.
"Notice of Allowance", U.S. Appl. No. 10/948,628, May 3, 2007, 2 pages.
"Notice of Allowance", U.S. Appl. No. 11/145,880, Jul. 5, 2007, 6 pages.
"Notice of Allowance", U.S. Appl. No. 11/145,880, Sep. 21, 2007, 4 pages.
"Notice of Allowance", U.S. Appl. No. 11/216,225, Mar. 10, 2009, 8 pages.
"Notice of Allowance", U.S. Appl. No. 11/231,321, Mar. 21, 2007, 4 pages.
"Notice of Allowance", U.S. Appl. No. 11/233,931, Aug. 10, 2006, 8 pages.
"Notice of Allowance", U.S. Appl. No. 11/314,807, Dec. 24, 2008, 4 pages.
"Notice of Allowance", U.S. Appl. No. 11/494,988, Jul. 17, 2009, 6 pages.
"Notice of Allowance", U.S. Appl. No. 11/562,313, May 23, 2008, 6 pages.
"Notice of Allowance", U.S. Appl. No. 11/748,388, May 19, 2009, 12 pages.
"Notice of Allowance", U.S. Appl. No. 11/761,760, Jul. 1, 2008, 6 pages.
"Notice of Allowance", U.S. Appl. No. 12/182,079, Jun. 23, 2010, 6 pages.
"Notice of Allowance", U.S. Appl. No. 14/168,876, Feb. 12, 2016, 5 pages.
"Notice of Allowance", U.S. Appl. No. 14/298,371, Jul. 2, 2015, 5 pages.
"Notice of Allowance", U.S. Appl. No. 14/339,234, Oct. 27, 2015, 9 pages.
"Notice of Allowance", U.S. Appl. No. 14/548,137, Dec. 10, 2015, 5 pages.
"Preinterview First Office Action", U.S. Appl. No. 14/338,592, Oct. 31, 2014, 4 pages.
"Preinterview First Office Action", U.S. Appl. No. 14/339,234, Nov. 19, 2014, 5 pages.
"Restriction Requirement", U.S. Appl. No. 10/948,628, Apr. 20, 2006, 7 pages.
"Restriction Requirement", U.S. Appl. No. 10/948,628, Dec. 30, 2005, 6 pages.
"Restriction Requirement", U.S. Appl. No. 11/562,313, Feb. 22, 2008, 5 pages.
"Restriction Requirement", U.S. Appl. No. 11/761,760, Oct. 11, 2007, 6 pages.
"Restriction Requirement", U.S. Appl. No. 12/193,641, Apr. 3, 2009, 7 pages.
"Supplemental Notice of Allowance", U.S. Appl. No. 11/145,880, Dec. 10, 2007, 2 pages.

* cited by examiner

CONTROLLED POWER-EFFICIENT OPERATION OF WIRELESS COMMUNICATION DEVICES

CROSS-REFERENCE TO RELATED APPLICATIONS

This application is a continuation of U.S. patent application Ser. No. 14/298,371, filed Jun. 6, 2014, and entitled "CONTROLLED POWER-EFFICIENT OPERATION OF WIRELESS COMMUNICATION DEVICES," which is a continuation of U.S. patent application Ser. No. 14/168,876, filed Jan. 30, 2014, and entitled "WIRELESS TRANSCEIVER," which is a continuation of U.S. patent application Ser. No. 12/905,248, filed Oct. 15, 2010, and entitled, "WIRELESS TRANSCEIVER," which is a continuation of U.S. patent application Ser. No. 12/182,079, filed Jul. 29, 2008, and entitled "WIRELESS TRANSCEIVER," now U.S. Pat. No. 7,817,031, which is a divisional of U.S. patent application Ser. No. 11/562,313, filed Nov. 21, 2006, and entitled "WIRELESS TRANSCEIVER," now U.S. Pat. No. 7,411,494, which is a continuation of U.S. patent application Ser. No. 10/856,231, filed May 27, 2004, and entitled "WIRELESS TRANSCEIVER," now U.S. Pat. No. 7,142,107. The entire disclosures of the above applications are hereby incorporated by reference, for all purposes, as if fully set forth herein.

BACKGROUND OF THE INVENTION

1. Field of the Invention

The present invention relates to a wireless sensor unit system providing bi-directional communication between a sensor (e.g., smoke sensor, fire sensor, temperature sensor, water, etc.) and a repeater or base unit in a building protection system.

2. Description of the Related Art

Maintaining and protecting a building or complex is difficult and costly. Some conditions, such as fires, gas leaks, etc. are a danger to the occupants and the structure. Other malfunctions, such as water leaks in roofs, plumbing, etc. are not necessarily dangerous for the occupants, but can nevertheless cause considerable damage. In many cases, an adverse ambient condition such as water leakage, fire, etc. is not detected in the early stages when the damage and/or danger is relatively small. Sensors can be used to detect such adverse ambient conditions, but sensors present their own set of problems. For example, adding sensors, such as, for example, smoke detectors, water sensors, and the like in an existing structure can be prohibitively expensive due to the cost of installing wiring between the remote sensors and a centralized monitoring device used to monitor the sensors. Adding wiring to provide power to the sensors further increases the cost. Moreover, with regard to fire sensors, most fire departments will not allow automatic notification of the fire department based on the data from a smoke detector alone. Most fire departments require that a specific temperature rate-of-rise be detected before an automatic fire alarm system can notify the fire department. Unfortunately, detecting fire by temperature rate-of-rise generally means that the fire is not detected until it is too late to prevent major damage.

SUMMARY

The present invention solves these and other problems by providing a relatively low cost, robust, wireless sensor system that provides an extended period of operability without maintenance. The system includes one or more intelligent sensor units and a base unit that can communicate with the sensor units. When one or more of the sensor units detects an anomalous condition (e.g., smoke, fire, water, etc.) the sensor unit communicates with the base unit and provides data regarding the anomalous condition. The base unit can contact a supervisor or other responsible person by a plurality of techniques, such as, telephone, pager, cellular telephone, Internet (and/or local area network), etc. In one embodiment, one or more wireless repeaters are used between the sensor units and the base unit to extend the range of the system and to allow the base unit to communicate with a larger number of sensors.

In one embodiment, the sensor system includes a number of sensor units located throughout a building that sense conditions and report anomalous results back to a central reporting station. The sensor units measure conditions that might indicate a fire, water leak, etc. The sensor units report the measured data to the base unit whenever the sensor unit determines that the measured data is sufficiently anomalous to be reported. The base unit can notify a responsible person such as, for example a building manager, building owner, private security service, etc. In one embodiment, the sensor units do not send an alarm signal to the central location. Rather, the sensors send quantitative measured data (e.g., smoke density, temperature rate of rise, etc.) to the central reporting station.

In one embodiment, the sensor system includes a battery-operated sensor unit that detects a condition, such as, for example, smoke, temperature, humidity, moisture, water, water temperature, carbon monoxide, natural gas, propane gas, other flammable gases, radon, poison gasses, etc. The sensor unit is placed in a building, apartment, office, residence, etc. In order to conserve battery power, the sensor is normally placed in a low-power mode. In one embodiment, while in the low power mode, the sensor unit takes regular sensor readings and evaluates the readings to determine if an anomalous condition exists. If an anomalous condition is detected, then the sensor unit "wakes up" and begins communicating with the base unit or with a repeater. At programmed intervals, the sensor also "wakes up" and sends status information to the base unit (or repeater) and then listens for commands for a period of time.

In one embodiment, the sensor unit is bi-directional and configured to receive instructions from the central reporting station (or repeater). Thus, for example, the central reporting station can instruct the sensor to: perform additional measurements; go to a standby mode; wake up; report battery status; change wake-up interval; run self-diagnostics and report results; etc. In one embodiment, the sensor unit also includes a tamper switch. When tampering with the sensor is detected, the sensor reports such tampering to the base unit. In one embodiment, the sensor reports its general health and status to the central reporting station on a regular basis (e.g., results of self-diagnostics, battery health, etc.).

In one embodiment, the sensor unit provides two wake-up modes, a first wake-up mode for taking measurements (and reporting such measurements if deemed necessary), and a second wake-up mode for listening for commands from the central reporting station. The two wake-up modes, or combinations thereof, can occur at different intervals.

In one embodiment, the sensor units use spread-spectrum techniques to communicate with the base unit and/or the repeater units. In one embodiment, the sensor units use frequency-hopping spread-spectrum. In one embodiment, each sensor unit has an Identification code (ID) and the sensor units attaches its ID to outgoing communication packets. In one embodiment, when receiving wireless data, each sensor unit ignores data that is addressed to other sensor units.

The repeater unit is configured to relay communications traffic between a number of sensor units and the base unit. The repeater units typically operate in an environment with several other repeater units and thus each repeater unit contains a database (e.g., a lookup table) of sensor IDs. During normal operation, the repeater only communicates with designated wireless sensor units whose IDs appears in the repeater's database. In one embodiment, the repeater is battery-operated and conserves power by maintaining an internal schedule of when its designated sensors are expected to transmit and going to a low-power mode when none of its designated sensor units is scheduled to transmit. In one embodiment, the repeater uses spread-spectrum to communicate with the base unit and the sensor units. In one embodiment, the repeater uses frequency-hopping spread-spectrum to communicate with the base unit and the sensor units. In one embodiment, each repeater unit has an ID and the repeater unit attaches its ID to outgoing communication packets that originate in the repeater unit. In one embodiment, each repeater unit ignores data that is addressed to other repeater units or to sensor units not serviced by the repeater.

In one embodiment, the repeater is configured to provide bi-directional communication between one or more sensors and a base unit. In one embodiment, the repeater is configured to receive instructions from the central reporting station (or repeater). Thus, for example, the central reporting station can instruct the repeater to: send commands to one or more sensors; go to standby mode; "wake up"; report battery status; change wake-up interval; run self-diagnostics and report results; etc.

The base unit is configured to receive measured sensor data from a number of sensor units. In one embodiment, the sensor information is relayed through the repeater units. The base unit also sends commands to the repeater units and/or sensor units. In one embodiment, the base unit includes a diskless PC that runs off of a CD-ROM, flash memory, DVD, or other read-only device, etc. When the base unit receives data from a wireless sensor indicating that there may be an emergency condition (e.g., a fire or excess smoke, temperature, water, flammable gas, etc.) the base unit will attempt to notify a responsible party (e.g., a building manager) by several communication channels (e.g., telephone, Internet, pager, cell phone, etc.). In one embodiment, the base unit sends instructions to place the wireless sensor in an alert mode (inhibiting the wireless sensor's low-power mode). In one embodiment, the base unit sends instructions to activate one or more additional sensors near the first sensor.

In one embodiment, the base unit maintains a database of the health, battery status, signal strength, and current operating status of all of the sensor units and repeater units in the wireless sensor system. In one embodiment, the base unit automatically performs routine maintenance by sending commands to each sensor to run a self-diagnostic and report the results. The bases unit collects such diagnostic results. In one embodiment, the base unit sends instructions to each sensor telling the sensor how long to wait between "wakeup" intervals. In one embodiment, the base unit schedules different wakeup intervals to different sensors based on the sensor's health, battery health, location, etc. In one embodiment, the base unit sends instructions to repeaters to route sensor information around a failed repeater.

DETAILED DESCRIPTION

Figure 1:
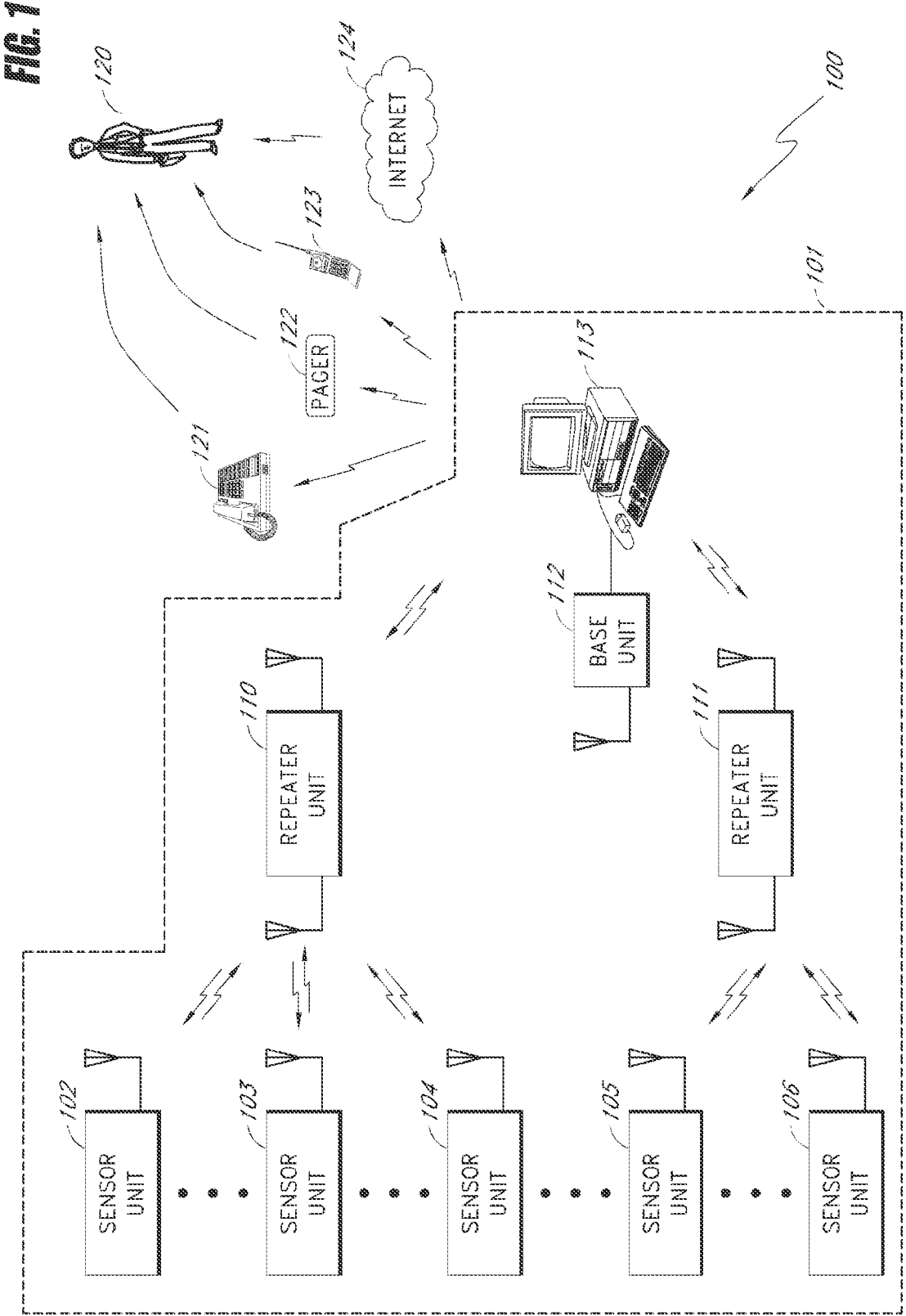
FIG. 1 shows a sensor system that includes a plurality of sensor units that communicate with a base unit through a number of repeater units.

FIG. 1 shows an sensor system 100 that includes a plurality of sensor units 102-106 that communicate with a base unit 112 through a number of repeater units 110-111. The sensor units 102-106 are located throughout a building 101. Sensor units 102-104 communicate with the repeater 110. Sensor units 105-105 communicate with the repeater 111. The repeaters 110-111 communicate with the base unit 112. The base unit 112 communicates with a monitoring computer system 113 through a computer network connection such as, for example, Ethernet, wireless Ethernet, firewire port, Universal Serial Bus (USB) port, bluetooth, etc. The computer system 113 contacts a building manager, maintenance service, alarm service, or other responsible personnel 120 using one or more of several communication systems such as, for example, telephone 121, pager 122, cellular telephone 123 (e.g., direct contact, voicemail, text, etc.), and/or through the Internet and/or local area network 124 (e.g., through email, instant messaging, network communications, etc.). In one embodiment, multiple base units 112 are provided to the monitoring computer 113. In one embodiment, the monitoring computer 113 is provided to more than one compute monitor, thus allowing more data to be displayed than can conveniently be displayed on a single monitor. In one embodiment, the monitoring computer 113 is provided to multiple monitors located in different locations, thus allowing the data form the monitoring computer 113 to be displayed in multiple locations.

The sensor units 102-106 include sensors to measure conditions, such as, for example, smoke, temperature, moisture, water, water temperature, humidity, carbon monoxide, natural gas, propane gas, security alarms, intrusion alarms (e.g., open doors, broken windows, open windows, and the like), other flammable gases, radon, poison gasses, etc. Different sensor units can be configured with different sensors or with combinations of sensors. Thus, for example, in one installation the sensor units 102 and 104 could be configured with smoke and/or temperature sensors while the sensor unit 103 could be configured with a humidity sensor.

The discussion that follows generally refers to the sensor unit 102 as an example of a sensor unit, with the understanding that the description of the sensor unit 102 can be applied to many sensor units. Similarly, the discussion generally refers to the repeater 110 by way of example, and not limitation. It will also be understood by one of ordinary skill in the art that repeaters are useful for extending the range of the sensor units 102-106 but are not required in all embodiments. Thus, for example in one embodiment, one or more of the sensor units 102-106 can communicate directly with the base unit 112 without going through a repeater. It will also be understood by one of ordinary skill in the art that FIG. 1 shows only five sensor units (102-106) and two repeater units (110-111) for purposes of illustration and not by way of limitation. An installation in a large apartment building or complex would typically involve many sensor units and repeater units. Moreover, one of ordinary skill in the art will recognize that one repeater unit can service relatively many sensor units. In one embodiment, the sensor units 102 can communicate directly with the base unit 112 without going through a repeater 111.

When the sensor unit 102 detects an anomalous condition (e.g., smoke, fire, water, etc.) the sensor unit communicates with the appropriate repeater unit 110 and provides data regarding the anomalous condition. The repeater unit 110 forwards the data to the base unit 112, and the base unit 112 forwards the information to the computer 113. The computer 113 evaluates the data and takes appropriate action. If the computer 113 determines that the condition is an emergency (e.g., fire, smoke, large quantities of water), then the computer 113 contacts the appropriate personnel 120. If the computer 113 determines that the situation warrants reporting, but is not an emergency, then the computer 113 logs the data for later reporting. In this way, the sensor system 100 can monitor the conditions in and around the building 101.

In one embodiment, the sensor unit 102 has an internal power source (e.g., battery, solar cell, fuel cell, etc.). In order to conserve power, the sensor unit 102 is normally placed in a low-power mode. In one embodiment, using sensors that require relatively little power, while in the low power mode the sensor unit 102 takes regular sensor readings and evaluates the readings to determine if an anomalous condition exists. In one embodiment, using sensors that require relatively more power, while in the low power mode the sensor unit 102 takes and evaluates sensor readings at periodic intervals. If an anomalous condition is detected, then the sensor unit 102 "wakes up" and begins communicating with the base unit 112 through the repeater 110. At programmed intervals, the sensor unit 102 also "wakes up" and sends status information (e.g., power levels, self diagnostic information, etc.) to the base unit (or repeater) and then listens for commands for a period of time. In one embodiment, the sensor unit 102 also includes a tamper detector. When tampering with the sensor unit 102 is detected, the sensor unit 102 reports such tampering to the base unit 112.

In one embodiment, the sensor unit 102 provides bi-directional communication and is configured to receive data and/or instructions from the base unit 112. Thus, for example, the base unit 112 can instruct the sensor unit 102 to perform additional measurements, to go to a standby mode, to wake up, to report battery status, to change wake-up interval, to run self-diagnostics and report results, etc. In one embodiment, the sensor unit 102 reports its general health and status on a regular basis (e.g., results of self-diagnostics, battery health, etc.).

In one embodiment, the sensor unit 102 provides two wake-up modes, a first wake-up mode for taking measurements (and reporting such measurements if deemed necessary), and a second wake-up mode for listening for commands from the central reporting station. The two wake-up modes, or combinations thereof, can occur at different intervals.

In one embodiment, the sensor unit 102 use spread-spectrum techniques to communicate with the repeater unit 110. In one embodiment, the sensor unit 102 use frequency-hopping spread-spectrum. In one embodiment, the sensor unit 102 has an address or identification (ID) code that distinguishes the sensor unit 102 from the other sensor units. The sensor unit 102 attaches its ID to outgoing communication packets so that transmissions from the sensor unit 102 can be identified by the repeater 110. The repeater 110 attaches the ID of the sensor unit 102 to data and/or instructions that are transmitted to the sensor unit 102. In one embodiment, the sensor unit 102 ignores data and/or instructions that are addressed to other sensor units.

In one embodiment, the sensor unit 102 includes a reset function. In one embodiment, the reset function is activated by the reset switch 208. In one embodiment, the reset function is active for a prescribed interval of time. During the reset interval, the transceiver 203 is in a receiving mode and can receive the identification code from an external programmer. In one embodiment, the external programmer wirelessly transmits a desired identification code. In one embodiment, the identification code is programmed by an external programmer that is connected to the sensor unit 102 through an electrical connector. In one embodiment, the electrical connection to the sensor unit 102 is provided by sending modulated control signals (power line carrier signals) through a connector used to connect the power source 206. In one embodiment, the external programmer provides power and control signals. In one embodiment, the external programmer also programs the type of sensor(s) installed in the sensor unit. In one embodiment, the identification code includes an area code (e.g., apartment number, zone number, floor number, etc.) and a unit number (e.g., unit 1, 2, 3, etc.).

In one embodiment, the sensor communicates with the repeater on the 900 MHz band. This band provides good transmission through walls and other obstacles normally found in and around a building structure. In one embodiment, the sensor communicates with the repeater on bands above and/or below the 900 MHz band. In one embodiment, the sensor, repeater, and/or base unit listen to a radio frequency channel before transmitting on that channel or before beginning transmission. If the channel is in use, (e.g., by another devise such as another repeater, a cordless telephone, etc.) then the sensor, repeater, and/or base unit changes to a different channel. In one embodiment, the sensor, repeater, and/or base unit coordinate frequency hopping by listening to radio frequency channels for interference and using an algorithm to select a next channel for transmission that avoids the interference. Thus, for example, in one embodiment, if a sensor senses a dangerous condition and goes into a continuous transmission mode, the sensor will test (e.g., listen to) the channel before transmission to avoid channels that are blocked, in use, or jammed. In one embodiment, the sensor continues to transmit data until it receives an acknowledgement from the base unit that the message has been received. In one embodiment, the sensor transmits data having a normal priority (e.g., status information) and does not look for an acknowledgement, and the sensor transmits data having elevated priority (e.g., excess smoke, temperature, etc.) until an acknowledgement is received.

The repeater unit 110 is configured to relay communications traffic between the sensor 102 (and, similarly, the sensor units 103-104) and the base unit 112. The repeater unit 110 typically operates in an environment with several other repeater units (such as the repeater unit 111 in FIG. 1) and thus the repeater unit 110 contains a database (e.g., a lookup table) of sensor unit IDs. In FIG. 1, the repeater 110 has database entries for the Ids of the sensors 102-104, and thus the sensor 110 will only communicate with sensor units 102-104. In one embodiment, the repeater 110 has an internal power source (e.g., battery, solar cell, fuel cell, etc.) and conserves power by maintaining an internal schedule of when the sensor units 102-104 are expected to transmit. In one embodiment, the repeater unit 110 goes to a low-power mode when none of its designated sensor units is scheduled to transmit. In one embodiment, the repeater 110 uses spread-spectrum techniques to communicate with the base unit 112 and with the sensor units 102-104. In one embodiment, the repeater 110 uses frequency-hopping spread-spectrum to communicate with the base unit 112 and the sensor units 102-104. In one embodiment, the repeater unit 110 has an address or identification (ID) code and the repeater unit 110 attaches its address to outgoing communication packets that originate in the repeater (that is, packets that are not being forwarded). In one embodiment, the repeater unit 110 ignores data and/or instructions that are addressed to other repeater units or to sensor units not serviced by the repeater 110.

In one embodiment, the base unit 112 communicates with the sensor unit 102 by transmitting a communication packet addressed to the sensor unit 102. The repeaters 110 and 111 both receive the communication packet addressed to the sensor unit 102. The repeater unit 111 ignores the communication packet addressed to the sensor unit 102. The repeater unit 110 transmits the communication packet addressed to the sensor unit 102 to the sensor unit 102. In one embodiment, the sensor unit 102, the repeater unit 110, and the base unit 112 communicate using Frequency-Hopping Spread Spectrum (FHSS), also known as channel-hopping.

Frequency-hopping wireless systems offer the advantage of avoiding other interfering signals and avoiding collisions. Moreover, there are regulatory advantages given to systems that do not transmit continuously at one frequency. Channel-hopping transmitters change frequencies after a period of continuous transmission, or when interference is encountered. These systems may have higher transmit power and relaxed limitations on in-band spurs. FCC regulations limit transmission time on one channel to 400 milliseconds (averaged over 10-20 seconds depending on channel bandwidth) before the transmitter must change frequency. There is a minimum frequency step when changing channels to resume transmission. If there are 25 to 49 frequency channels, regulations allow effective radiated power of 24 dBm, spurs must be −20 dBc, and harmonics must be −41.2 dBc. With 50 or more channels, regulations allow effective radiated power to be up to 30 dBm.

In one embodiment, the sensor unit 102, the repeater unit 110, and the base unit 112 communicate using FHSS wherein the frequency hopping of the sensor unit 102, the repeater unit 110, and the base unit 112 are not synchronized such that at any given moment, the sensor unit 102 and the repeater unit 110 are on different channels. In such a system, the base unit 112 communicates with the sensor unit 102 using the hop frequencies synchronized to the repeater unit 110 rather than the sensor unit 102. The repeater unit 110 then forwards the data to the sensor unit using hop frequencies synchronized to the sensor unit 102. Such a system largely avoids collisions between the transmissions by the base unit 112 and the repeater unit 110.

In one embodiment, the sensor units 102-106 all use FHSS and the sensor units 102-106 are not synchronized. Thus, at any given moment, it is unlikely that any two or more of the sensor units 102-106 will transmit on the same frequency. In this manner, collisions are largely avoided. In one embodiment, collisions are not detected but are tolerated by the system 100. If a collisions does occur, data lost due to the collision is effectively re-transmitted the next time the sensor units transmit sensor data. When the sensor units 102-106 and repeater units 110-111 operate in asynchronous mode, then a second collision is highly unlikely because the units causing the collisions have hopped to different channels. In one embodiment, the sensor units 102-106, repeater units 110-110, and the base unit 112 use the same hop rate. In one embodiment, the sensor units 102-106, repeater units 110-110, and the base unit 112 use the same pseudo-random algorithm to control channel hopping, but with different starting seeds. In one embodiment, the starting seed for the hop algorithm is calculated from the ID of the sensor units 102-106, repeater units 110-110, or the base unit 112.

In an alternative embodiment, the base unit communicates with the sensor unit 102 by sending a communication packet addressed to the repeater unit 110, where the packet sent to the repeater unit 110 includes the address of the sensor unit 102. The repeater unit 102 extracts the address of the sensor unit 102 from the packet and creates and transmits a packet addressed to the sensor unit 102.

In one embodiment, the repeater unit 110 is configured to provide bi-directional communication between its sensors and the base unit 112. In one embodiment, the repeater 110 is configured to receive instructions from the base unit 110. Thus, for example, the base unit 112 can instruct the repeater to: send commands to one or more sensors; go to standby mode; "wake up"; report battery status; change wake-up interval; run self-diagnostics and report results; etc.

The base unit 112 is configured to receive measured sensor data from a number of sensor units either directly, or through the repeaters 110-111. The base unit 112 also sends commands to the repeater units 110-111 and/or to the sensor units 110-111. In one embodiment, the base unit 112 communicates with a diskless computer 113 that runs off of a CD-ROM. When the base unit 112 receives data from a sensor unit 102-111 indicating that there may be an emergency condition (e.g., a fire or excess smoke, temperature, water, etc.) the computer 113 will attempt to notify the responsible party 120.

In one embodiment, the computer 112 maintains a database of the health, power status (e.g., battery charge), and current operating status of all of the sensor units 102-106 and the repeater units 110-111. In one embodiment, the computer 113 automatically performs routine maintenance by sending commands to each sensor unit 102-106 to run a self-diagnostic and report the results. The computer 113 collects and logs such diagnostic results. In one embodiment, the computer 113 sends instructions to each sensor unit 102-106 telling the sensor how long to wait between "wakeup" intervals. In one embodiment, the computer 113 schedules different wakeup intervals to different sensor unit 102-106 based on the sensor unit's health, power status, location, etc. In one embodiment, the computer 113 schedules different wakeup intervals to different sensor unit 102-106 based on the type of data and urgency of the data collected by the sensor unit (e.g., sensor units that have smoke and/or temperature sensors produce data that should be checked relatively more often than sensor units that have humidity or moisture sensors). In one embodiment, the base unit sends instructions to repeaters to route sensor information around a failed repeater.

In one embodiment, the computer 113 produces a display that tells maintenance personnel which sensor units 102-106 need repair or maintenance. In one embodiment, the computer 113 maintains a list showing the status and/or location of each sensor according to the ID of each sensor.

In one embodiment, the sensor units 102-106 and/or the repeater units 110-111 measure the signal strength of the wireless signals received (e.g., the sensor unit 102 measures the signal strength of the signals received from the repeater unit 110, the repeater unit 110 measures the signal strength received from the sensor unit 102 and/or the base unit 112). The sensor units 102-106 and/or the repeater units 110-111 report such signal strength measurement back to the computer 113. The computer 113 evaluates the signal strength measurements to ascertain the health and robustness of the sensor system 100. In one embodiment, the computer 113 uses the signal strength information to re-route wireless communications traffic in the sensor system 100. Thus, for example, if the repeater unit 110 goes offline or is having difficulty communicating with the sensor unit 102, the computer 113 can send instructions to the repeater unit 111 to add the ID of the sensor unit 102 to the database of the repeater unit 111 (and similarly, send instructions to the repeater unit 110 to remove the ID of the sensor unit 102), thereby routing the traffic for the sensor unit 102 through the router unit 111 instead of the router unit 110.

Figure 2:
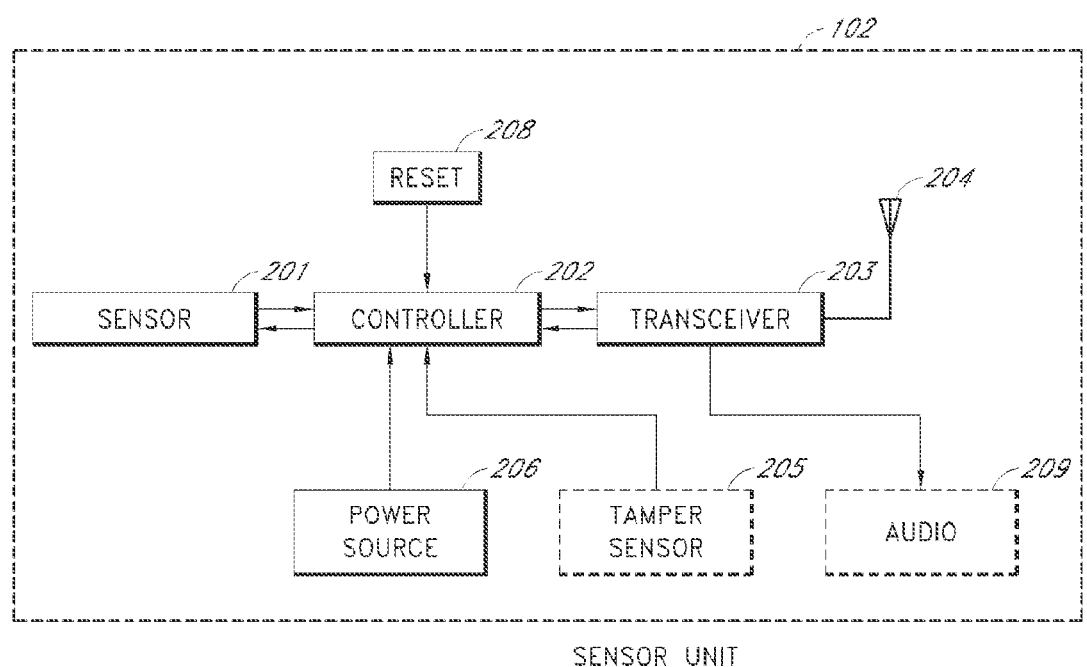
FIG. 2 is a block diagram of a sensor unit.

FIG. 2 is a block diagram of the sensor unit 102. In the sensor unit 102, one or more sensors 201 and a transceiver 203 are provided to a controller 202. The controller 202 typically provides power, data, and control information to the sensor(s) 201 and the transceiver 203. A power source 206 is provided to the controller 202. An optional tamper sensor 205 is also provided to the controller 202. A reset device (e.g., a switch) 208 is proved to the controller 202. In one embodiment, an optional audio output device 209 is provided. In one embodiment, the sensor 201 is configured as a plug-in module that can be replaced relatively easily.

In one embodiment, the transceiver 203 is based on a TRF 6901 transceiver chip from Texas Instruments, Inc. In one embodiment, the controller 202 is a conventional programmable microcontroller. In one embodiment, the controller 202 is based on a Field Programmable Gate Array (FPGA), such as, for example, provided by Xilinx Corp. In one embodiment, the sensor 201 includes an optoelectric smoke sensor with a smoke chamber. In one embodiment, the sensor 201 includes a thermistor. In one embodiment, the sensor 201 includes a humidity sensor. In one embodiment, the sensor 201 includes an sensor, such as, for example, a water level sensor, a water temperature sensor, a carbon monoxide sensor, a moisture sensor, a water flow sensor, natural gas sensor, propane sensor, etc.

The controller 202 receives sensor data from the sensor(s) 201. Some sensors 201 produce digital data. However, for many types of sensors 201, the sensor data is analog data. Analog sensor data is converted to digital format by the controller 202. In one embodiment, the controller evaluates the data received from the sensor(s) 201 and determines whether the data is to be transmitted to the base unit 112. The sensor unit 102 generally conserves power by not transmitting data that falls within a normal range. In one embodiment, the controller 202 evaluates the sensor data by comparing the data value to a threshold value (e.g., a high threshold, a low threshold, or a high-low threshold). If the data is outside the threshold (e.g., above a high threshold, below a low threshold, outside an inner range threshold, or inside an outer range threshold), then the data is deemed to be anomalous and is transmitted to the base unit 112. In one embodiment, the data threshold is programmed into the controller 202. In one embodiment, the data threshold is programmed by the base unit 112 by sending instructions to the controller 202. In one embodiment, the controller 202 obtains sensor data and transmits the data when commanded by the computer 113.

In one embodiment, the tamper sensor 205 is configured as a switch that detects removal of or tampering with the sensor unit 102.

Figure 3:
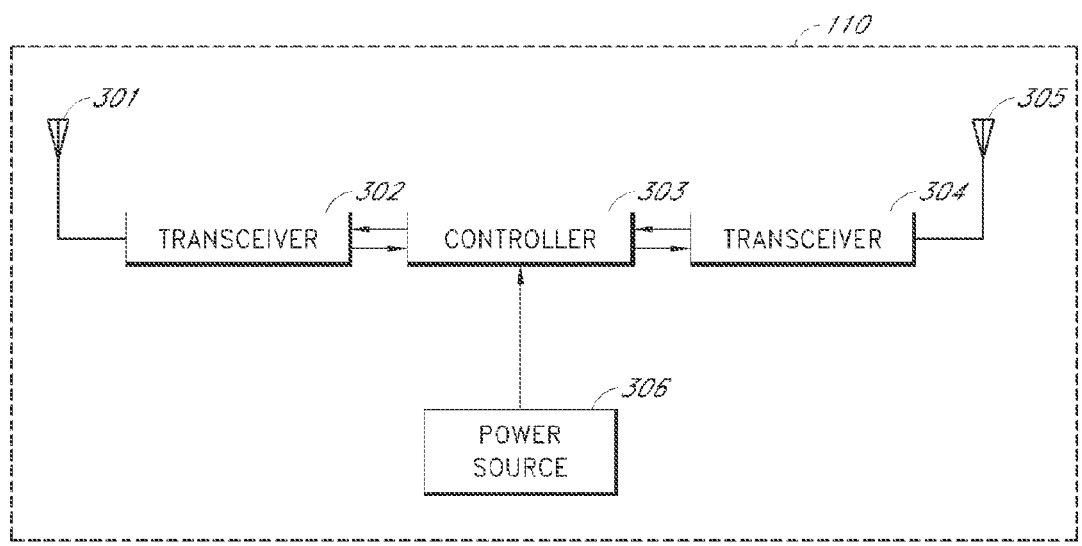
FIG. 3 is a block diagram of a repeater unit.

FIG. 3 is a block diagram of the repeater unit 110. In the repeater unit 110, a first transceiver 302 and a second transceiver 305 are provided to a controller 303. The controller 303 typically provides power, data, and control information to the transceivers 302, 304. A power source 306 is provided to the controller 303. An optional tamper sensor (not shown) is also provided to the controller 303.

When relaying sensor data to the base unit 112, the controller 303 receives data from the first transceiver 303 and provides the data to the second transceiver 304. When relaying instructions from the base unit 112 to a sensor unit, the controller 303 receives data from the second transceiver 304 and provides the data to the first transceiver 302. In one embodiment, the controller 303 conserves power by powering-down the transceivers 302, 304 during periods when the controller 303 is not expecting data. The controller 303 also monitors the power source 306 and provides status information, such as, for example, self-diagnostic information and/or information about the health of the power source 306, to the base unit 112. In one embodiment, the controller 303 sends status information to the base unit 112 at regular intervals. In one embodiment, the controller 303 sends status information to the base unit 112 when requested by the base unit 112. In one embodiment, the controller 303 sends status information to the base unit 112 when a fault condition (e.g., battery low) is detected.

In one embodiment, the controller 303 includes a table or list of identification codes for wireless sensor units 102. The repeater 303 forwards packets received from, or sent to, sensor units 102 in the list. In one embodiment, the repeater 110 receives entries for the list of sensor units from the computer 113. In one embodiment, the controller 303 determines when a transmission is expected from the sensor units 102 in the table of sensor units and places the repeater 110 (e.g., the transceivers 302, 304) in a low-power mode when no transmissions are expected from the transceivers on the list. In one embodiment, the controller 303 recalculates the times for low-power operation when a command to change reporting interval is forwarded to one of the sensor units 102 in the list (table) of sensor units or when a new sensor unit is added to the list (table) of sensor units.

Figure 4:
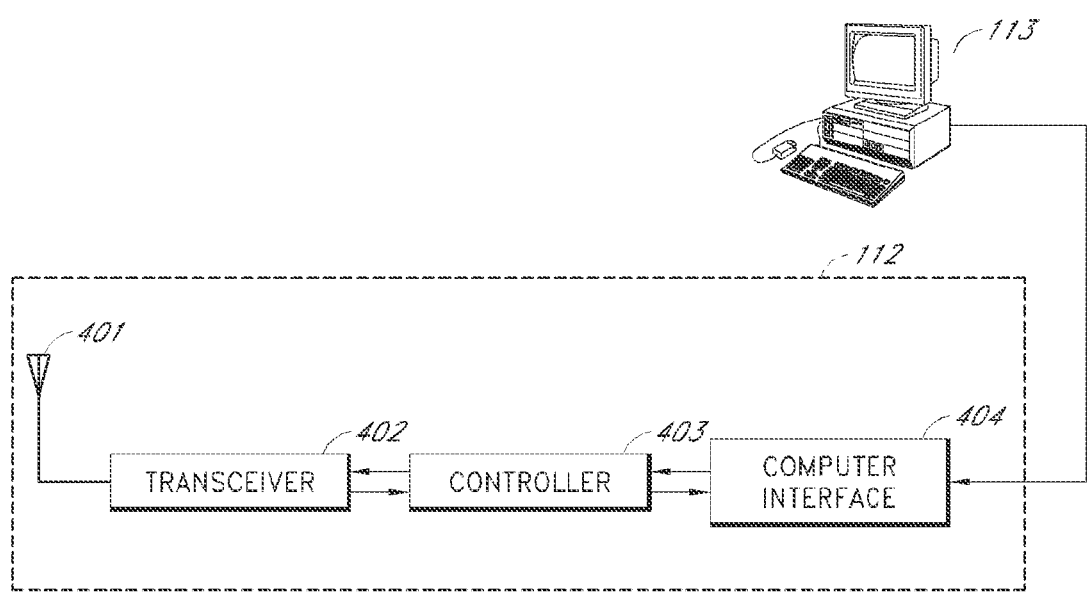
FIG. 4 is a block diagram of the base unit.

FIG. 4 is a block diagram of the base unit 112. In the base unit 112, a transceiver 402 and a computer interface 404 are provided to a controller 403. The controller 303 typically provides data and control information to the transceivers 402 and to the interface. The interface 402 is provided to a port on the monitoring computer 113. The interface 402 can be a standard computer data interface, such as, for example, Ethernet, wireless Ethernet, firewire port, Universal Serial Bus (USB) port, bluetooth, etc.

Figure 5:
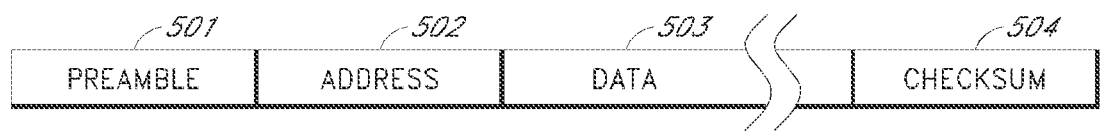
FIG. 5 shows one embodiment a network communication packet used by the sensor units, repeater units, and the base unit.

FIG. 5 shows one embodiment a communication packet 500 used by the sensor units, repeater units, and the base unit. The packet 500 includes a preamble portion 501, an address (or ID) portion 502, a data payload portion 503, and an integrity portion 504. In one embodiment, the integrity portion 504 includes a checksum. In one embodiment, the sensor units 102-106, the repeater units 110-111, and the base unit 112 communicate using packets such as the packet 500. In one embodiment, the packets 500 are transmitted using FHSS.

In one embodiment, the data packets that travel between the sensor unit 102, the repeater unit 111, and the base unit 112 are encrypted. In one embodiment, the data packets that travel between the sensor unit 102, the repeater unit 111, and the base unit 112 are encrypted and an authentication code is provided in the data packet so that the sensor unit 102, the repeater unit, and/or the base unit 112 can verify the authenticity of the packet.

In one embodiment the address portion 502 includes a first code and a second code. In one embodiment, the repeater 111 only examines the first code to determine if the packet should be forwarded. Thus, for example, the first code can be interpreted as a building (or building complex) code and the second code interpreted as a subcode (e.g., an apartment code, area code, etc.). A repeater that uses the first code for forwarding thus forwards packets having a specified first code (e.g., corresponding to the repeater's building or building complex). Thus alleviates the need to program a list of sensor units 102 into a repeater, since a group of sensors in a building will typically all have the same first code but different second codes. A repeater so configured, only needs to know the first code to forward packets for any repeater in the building or building complex. This does, however, raise the possibility that two repeaters in the same building could try to forward packets for the same sensor unit 102. In one embodiment, each repeater waits for a programmed delay period before forwarding a packet. Thus reducing the chance of packet collisions at the base unit (in the case of sensor unit to base unit packets) and reducing the chance of packet collisions at the sensor unit (in the case of base unit to sensor unit packets). In one embodiment, a delay period is programmed into each repeater. In one embodiment, delay periods are pre-programmed onto the repeater units at the factory or during installation. In one embodiment, a delay period is programmed into each repeater by the base unit 112. In one embodiment, a repeater randomly chooses a delay period. In one embodiment, a repeater randomly chooses a delay period for each forwarded packet. In one embodiment, the first code is at least 6 digits. In one embodiment, the second code is at least 5 digits.

In one embodiment, the first code and the second code are programmed into each sensor unit at the factory. In one embodiment, the first code and the second code are programmed when the sensor unit is installed. In one embodiment, the base unit 112 can re-program the first code and/or the second code in a sensor unit.

In one embodiment, collisions are further avoided by configuring each repeater unit 111 to begin transmission on a different frequency channel. Thus, if two repeaters attempt to begin transmission at the same time, the repeaters will not interfere with each other because the transmissions will begin on different channels (frequencies).

Figure 6:
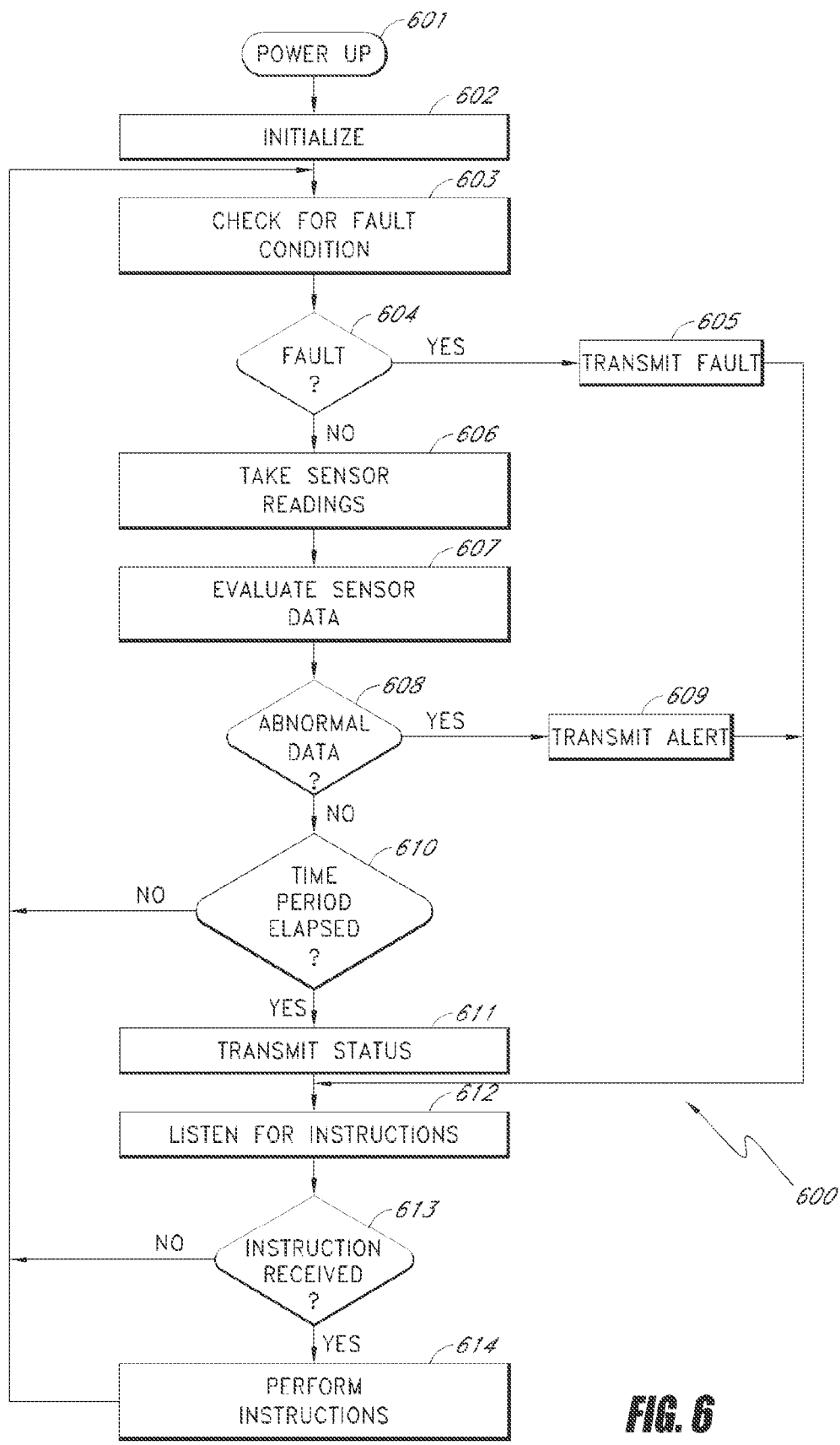
FIG. 6 is a flowchart showing operation of a sensor unit that provides relatively continuous monitoring.

FIG. 6 is a flowchart showing one embodiment of the operation of the sensor unit 102 wherein relatively continuous monitoring is provided. In FIG. 6, a power up block 601 is followed by an initialization block 602. After initialization, the sensor unit 102 checks for a fault condition (e.g., activation of the tamper sensor, low battery, internal fault, etc.) in a block 603. A decision block 604 checks the fault status. If a fault has occurred, then the process advances to a block 605 were the fault information is transmitted to the repeater 110 (after which, the process advances to a block 612); otherwise, the process advances to a block 606. In the block 606, the sensor unit 102 takes a sensor reading from the sensor(s) 201. The sensor data is subsequently evaluated in a block 607. If the sensor data is abnormal, then the process advances to a transmit block 609 where the sensor data is transmitted to the repeater 110 (after which, the process advances to a block 612); otherwise, the process advances to a timeout decision block 610. If the timeout period has not elapsed, then the process returns to the fault-check block 603; otherwise, the process advances to a transmit status block 611 where normal status information is transmitted to the repeater 110. In one embodiment, the normal status information transmitted is analogous to a simple "ping" which indicates that the sensor unit 102 is functioning normally. After the block 611, the process proceeds to a block 612 where the sensor unit 102 momentarily listens for instructions from the monitor computer 113. If an instruction is received, then the sensor unit 102 performs the instructions, otherwise, the process returns to the status check block 603. In one embodiment, transceiver 203 is normally powered down. The controller 202 powers up the transceiver 203 during execution of the blocks 605, 609, 611, and 612. The monitoring computer 113 can send instructions to the sensor unit 102 to change the parameters used to evaluate data used in block 607, the listen period used in block 612, etc.

Figure 7:
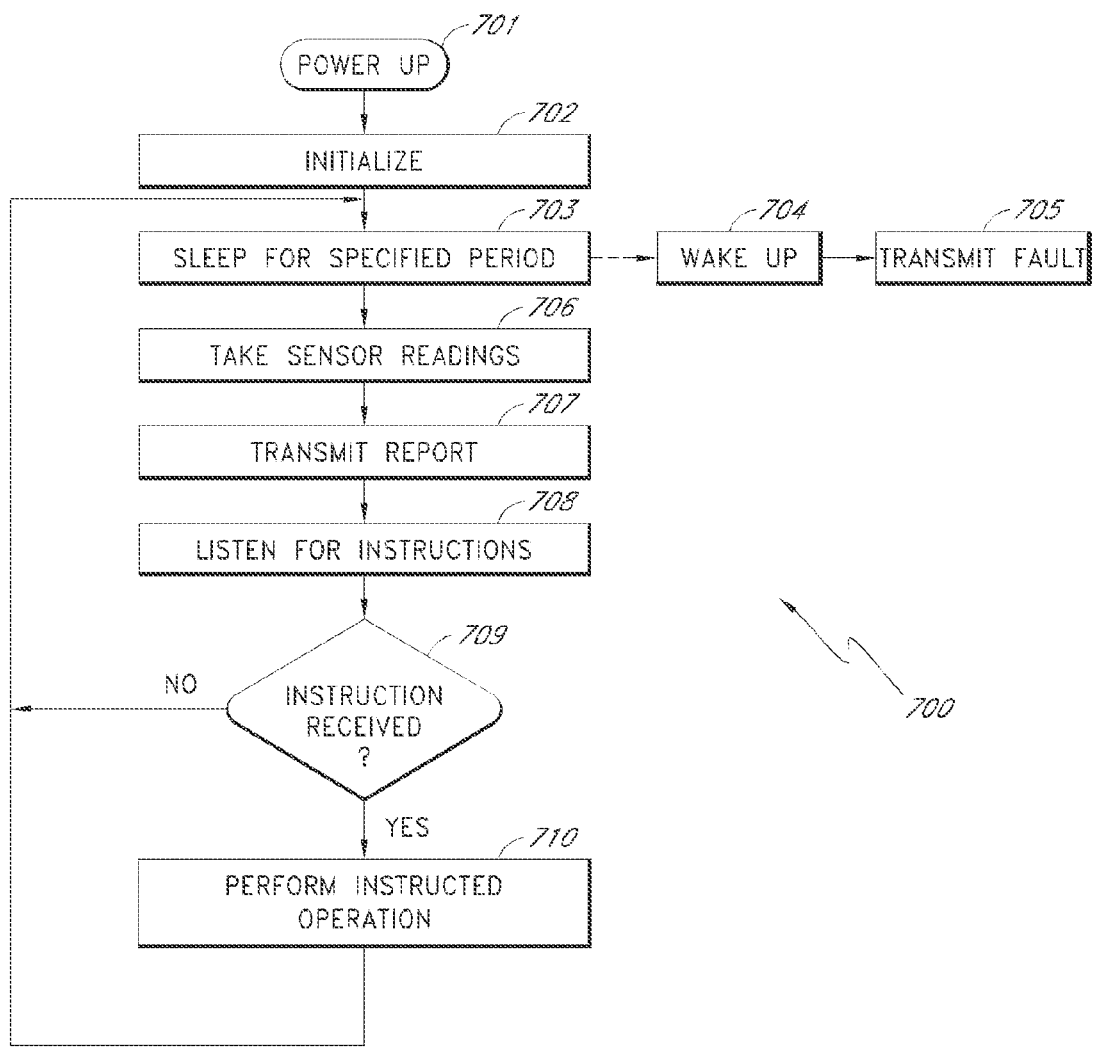
FIG. 7 is a flowchart showing operation of a sensor unit that provides periodic monitoring.

Relatively continuous monitoring, such as shown in FIG. 6, is appropriate for sensor units that sense relatively high-priority data (e.g., smoke, fire, carbon monoxide, flammable gas, etc.). By contrast, periodic monitoring can be used for sensors that sense relatively lower priority data (e.g., humidity, moisture, water usage, etc.). FIG. 7 is a flowchart showing one embodiment of operation of the sensor unit 102 wherein periodic monitoring is provided. In FIG. 7, a power up block 701 is followed by an initialization block 702. After initialization, the sensor unit 102 enters a low-power sleep mode. If a fault occurs during the sleep mode (e.g., the tamper sensor is activated), then the process enters a wake-up block 704 followed by a transmit fault block 705. If no fault occurs during the sleep period, then when the specified sleep period has expired, the process enters a block 706 where the sensor unit 102 takes a sensor reading from the sensor(s) 201. The sensor data is subsequently sent to the monitoring computer 113 in a report block 707. After reporting, the sensor unit 102 enters a listen block 708 where the sensor unit 102 listens for a relatively short period of time for instructions from monitoring computer 708. If an instruction is received, then the sensor unit 102 performs the instructions, otherwise, the process returns to the sleep block 703. In one embodiment, the sensor 201 and transceiver 203 are normally powered down. The controller 202 powers up the sensor 201 during execution of the block 706. The controller 202 powers up the transceiver during execution of the blocks 705, 707, and 708. The monitoring computer 113 can send instructions to the sensor unit 102 to change the sleep period used in block 703, the listen period used in block 708, etc.

In one embodiment, the sensor unit transmits sensor data until a handshaking-type acknowledgement is received. Thus, rather than sleep if no instructions or acknowledgements are received after transmission (e.g., after the decision block 613 or 709) the sensor unit 102 retransmits its data and waits for an acknowledgement. The sensor unit 102 continues to transmit data and wait for an acknowledgement until an acknowledgement is received. In one embodiment, the sensor unit accepts an acknowledgement from a repeater unit 111 and it then becomes the responsibility of the repeater unit 111 to make sure that the data is forwarded to the base unit 112. In one embodiment, the repeater unit 111 does not generate the acknowledgement, but rather forwards an acknowledgement from the base unit 112 to the sensor unit 102. The two-way communication ability of the sensor unit 102 provides the capability for the base unit 112 to control the operation of the sensor unit 102 and also provides the capability for robust handshaking-type communication between the sensor unit 102 and the base unit 112.

Regardless of the normal operating mode of the sensor unit 102 (e.g., using the Flowcharts of FIGS. 6, 7, or other modes) in one embodiment, the monitoring computer 113 can instruct the sensor unit 102 to operate in a relatively continuous mode where the sensor repeatedly takes sensor readings and transmits the readings to the monitoring computer 113. Such a mode can be used, for example, when the sensor unit 102 (or a nearby sensor unit) has detected a potentially dangerous condition (e.g., smoke, rapid temperature rise, etc.).

Figure 8:
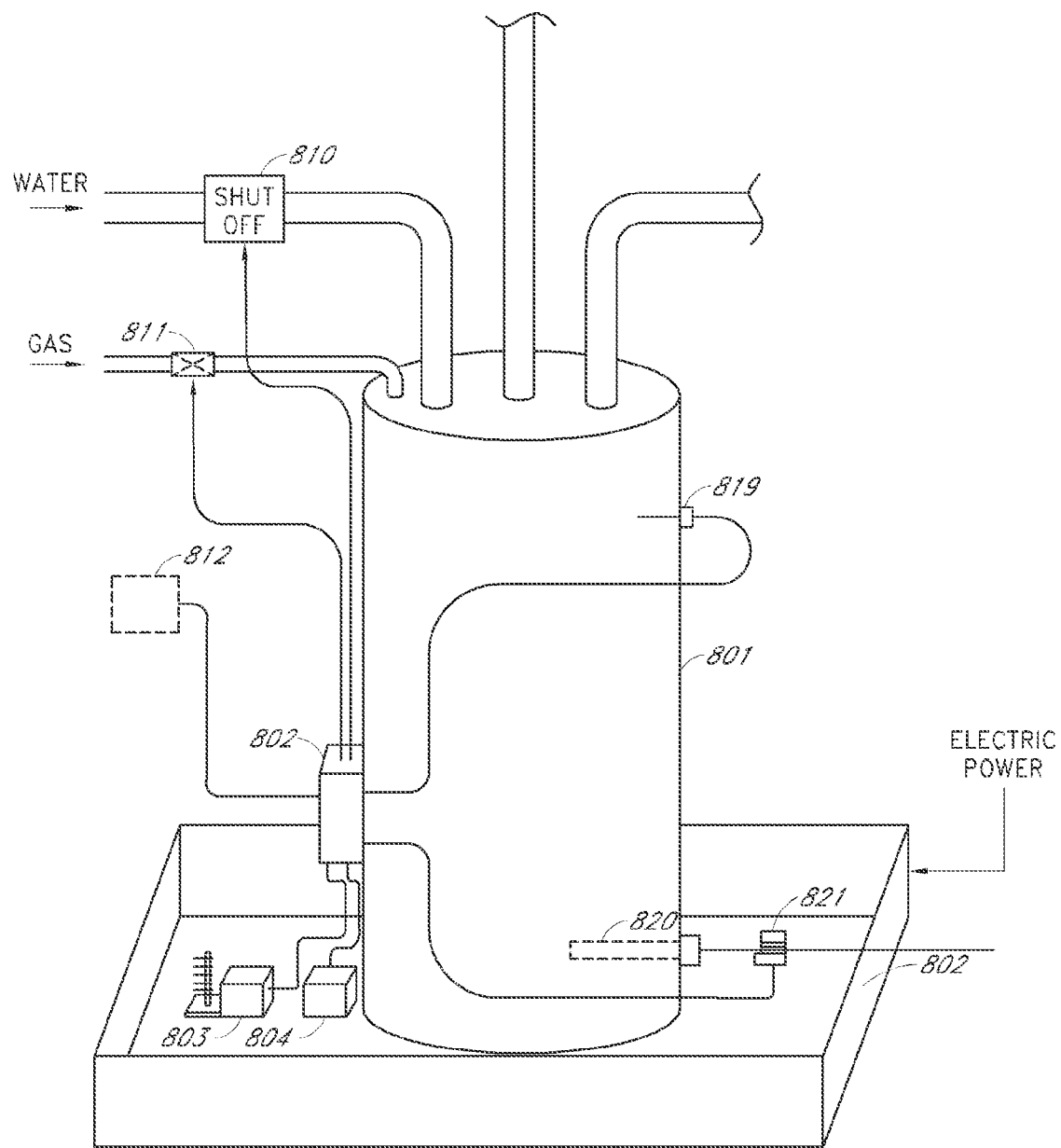
FIG. 8 shows how the sensor system can be used to detected water leaks.

FIG. 8 shows the sensor system used to detect water leaks. In one embodiment, the sensor unit 102 includes a water level sensor 803 and/or a water temperature sensor 804. The water level sensor 803 and/or water temperature sensor 804 are place, for example, in a tray underneath a water heater 801 in order to detect leaks from the water heater 801 and thereby prevent water damage from a leaking water heater. In one embodiment, a temperature sensor is also provided to measure temperature near the water heater. The water level sensor can also be placed under a sink, in a floor sump, etc. In one embodiment, the severity of a leak is ascertained by the sensor unit 102 (or the monitoring computer 113) by measuring the rate of rise in the water level. When placed near the hot water tank 801, the severity of a leak can also be ascertained at least in part by measuring the temperature of the water. In one embodiment, a first water flow sensor is placed in an input water line for the hot water tank 801 and a second water flow sensor is placed in an output water line for the hot water tank. Leaks in the tank can be detected by observing a difference between the water flowing through the two sensors.

In one embodiment, a remote shutoff valve 810 is provided, so that the monitoring system 100 can shutoff the water supply to the water heater when a leak is detected. In one embodiment, the shutoff valve is controlled by the sensor unit 102. In one embodiment, the sensor unit 102 receives instructions from the base unit 112 to shut off the water supply to the heater 801. In one embodiment, the responsible party 120 sends instructions to the monitoring computer 113 instructing the monitoring computer 113 to send water shut off instructions to the sensor unit 102. Similarly, in one embodiment, the sensor unit 102 controls a gas shutoff valve 811 to shut off the gas supply to the water heater 801 and/or to a furnace (not shown) when dangerous conditions (such as, for example, gas leaks, carbon monoxide, etc.) are detected. In one embodiment, a gas detector 812 is provided to the sensor unit 102. In one embodiment, the gas detector 812 measures carbon monoxide. In one embodiment, the gas detector 812 measures flammable gas, such as, for example, natural gas or propane.

In one embodiment, an optional temperature sensor 818 is provided to measure stack temperature. Using data from the temperature sensor 818, the sensor unit 102 reports conditions, such as, for example, excess stack temperature. Excess stack temperature is often indicative of poor heat transfer (and thus poor efficiency) in the water heater 818.

In one embodiment, an optional temperature sensor 819 is provided to measure temperature of water in the water heater 810. Using data from the temperature sensor 819, the sensor unit 102 reports conditions, such as, for example, over-temperature or under-temperature of the water in the water heater.

In one embodiment, an optional current probe 821 is provided to measure electric current provided to a heating element 820 in an electric water heater. Using data from the current probe 821, the sensor unit 102 reports conditions, such as, for example, no current (indicating a burned-out heating element 820). An over-current condition often indicates that the heating element 820 is encrusted with mineral deposits and needs to be replaced or cleaned. By measuring the current provided to the water heater, the monitoring system can measure the amount of energy provided to the water heater and thus the cost of hot water, and the efficiency of the water heater.

In one embodiment, the sensor 803 includes a moisture sensor. Using data from the moisture sensor, the sensor unit 102 reports moisture conditions, such as, for example, excess moisture that would indicate a water leak, excess condensation, etc.

In one embodiment, the sensor unit 102 is provided to a moisture sensor (such as the sensor 803) located near an air conditioning unit. Using data from the moisture sensor, the sensor unit 102 reports moisture conditions, such as, for example, excess moisture that would indicate a water leak, excess condensation, etc.

In one embodiment, the sensor 201 includes a moisture sensor. The moisture sensor can be place under a sink or a toilet (to detect plumbing leaks) or in an attic space (to detect roof leaks).

Excess humidity in a structure can cause sever problems such as rotting, growth of molds, mildew, and fungus, etc. (hereinafter referred to generically as fungus). In one embodiment, the sensor 201 includes a humidity sensor. The humidity sensor can be place under a sink, in an attic space, etc. to detect excess humidity (due to leaks, condensation, etc.). In one embodiment, the monitoring computer 113 compares humidity measurements taken from different sensor units in order to detect areas that have excess humidity. Thus for example, the monitoring computer 113 can compare the humidity readings from a first sensor unit 102 in a first attic area, to a humidity reading from a second sensor unit 102 in a second area. For example, the monitoring computer can take humidity readings from a number of attic areas to establish a baseline humidity reading and then compare the specific humidity readings from various sensor units to determine if one or more of the units are measuring excess humidity. The monitoring computer 113 would flag areas of excess humidity for further investigation by maintenance personnel. In one embodiment, the monitoring computer 113 maintains a history of humidity readings for various sensor units and flags areas that show an unexpected increase in humidity for investigation by maintenance personnel.

In one embodiment, the monitoring system 100 detects conditions favorable for fungus (e.g., mold, mildew, fungus, etc.) growth by using a first humidity sensor located in a first building area to produce first humidity data and a second humidity sensor located in a second building area to produce second humidity data. The building areas can be, for example, areas near a sink drain, plumbing fixture, plumbing, attic areas, outer walls, a bilge area in a boat, etc.

The monitoring station 113 collects humidity readings from the first humidity sensor and the second humidity sensor and indicates conditions favorable for fungus growth by comparing the first humidity data and the second humidity data. In one embodiment, the monitoring station 113 establishes a baseline humidity by comparing humidity readings from a plurality of humidity sensors and indicates possible fungus growth conditions in the first building area when at least a portion of the first humidity data exceeds the baseline humidity by a specified amount. In one embodiment, the monitoring station 113 establishes a baseline humidity by comparing humidity readings from a plurality of humidity sensors and indicates possible fungus growth conditions in the first building area when at least a portion of the first humidity data exceeds the baseline humidity by a specified percentage.

In one embodiment, the monitoring station 113 establishes a baseline humidity history by comparing humidity readings from a plurality of humidity sensors and indicates possible fungus growth conditions in the first building area when at least a portion of the first humidity data exceeds the baseline humidity history by a specified amount over a specified period of time. In one embodiment, the monitoring station 113 establishes a baseline humidity history by comparing humidity readings from a plurality of humidity sensors over a period of time and indicates possible fungus growth conditions in the first building area when at least a portion of the first humidity data exceeds the baseline humidity by a specified percentage of a specified period of time.

In one embodiment, the sensor unit 102 transmits humidity data when it determines that the humidity data fails a threshold test. In one embodiment, the humidity threshold for the threshold test is provided to the sensor unit 102 by the monitoring station 113. In one embodiment, the humidity threshold for the threshold test is computed by the monitoring station from a baseline humidity established in the monitoring station. In one embodiment, the baseline humidity is computed at least in part as an average of humidity readings from a number of humidity sensors. In one embodiment, the baseline humidity is computed at least in part as a time average of humidity readings from a number of humidity sensors. In one embodiment, the baseline humidity is computed at least in part as a time average of humidity readings from a humidity sensor. In one embodiment, the baseline humidity is computed at least in part as the lesser of a maximum humidity reading an average of a number of humidity readings.

In one embodiment, the sensor unit 102 reports humidity readings in response to a query by the monitoring station 113. In one embodiment, the sensor unit 102 reports humidity readings at regular intervals. In one embodiment, a humidity interval is provided to the sensor unit 102 by the monitoring station 113.

In one embodiment, the calculation of conditions for fungus growth is comparing humidity readings from one or more humidity sensors to the baseline (or reference) humidity. In one embodiment, the comparison is based on comparing the humidity readings to a percentage (e.g., typically a percentage greater than 100%) of the baseline value. In one embodiment, the comparison is based on comparing the humidity readings to a specified delta value above the reference humidity. In one embodiment, the calculation of likelihood of conditions for fungus growth is based on a time history of humidity readings, such that the longer the favorable conditions exist, the greater the likelihood of fungus growth. In one embodiment, relatively high humidity readings over a period of time indicate a higher likelihood of fungus growth than relatively high humidity readings for short periods of time. In one embodiment, a relatively sudden increase in humidity as compared to a baseline or reference humidity is reported by the monitoring station 113 as a possibility of a water leak. If the relatively high humidity reading continues over time then the relatively high humidity is reported by the monitoring station 113 as possibly being a water leak and/or an area likely to have fungus growth or water damage.

Temperatures relatively more favorable to fungus growth increase the likelihood of fungus growth. In one embodiment, temperature measurements from the building areas are also used in the fungus grown-likelihood calculations. In one embodiment, a threshold value for likelihood of fungus growth is computed at least in part as a function of temperature, such that temperatures relatively more favorable to fungus growth result in a relatively lower threshold than temperatures relatively less favorable for fungus growth. In one embodiment, the calculation of a likelihood of fungus growth depends at least in part on temperature such that temperatures relatively more favorable to fungus growth indicate a relatively higher likelihood of fungus growth than temperatures relatively less favorable for fungus growth. Thus, in one embodiment, a maximum humidity and/or minimum threshold above a reference humidity is relatively lower for temperature more favorable to fungus growth than the maximum humidity and/or minimum threshold above a reference humidity for temperatures relatively less favorable to fungus growth.

In one embodiment, a water flow sensor is provided to the sensor unit 102. The sensor unit 102 obtains water flow data from the water flow sensor and provides the water flow data to the monitoring computer 113. The monitoring computer 113 can then calculate water usage. Additionally, the monitoring computer can watch for water leaks, by, for example, looking for water flow when there should be little or no flow. Thus, for example, if the monitoring computer detects water usage throughout the night, the monitoring computer can raise an alert indicating that a possible water leak has occurred.

In one embodiment, the sensor 201 includes a water flow sensor is provided to the sensor unit 102. The sensor unit 102 obtains water flow data from the water flow sensor and provides the water flow data to the monitoring computer 113. The monitoring computer 113 can then calculate water usage. Additionally, the monitoring computer can watch for water leaks, by, for example, looking for water flow when there should be little or no flow. Thus, for example, if the monitoring computer detects water usage throughout the night, the monitoring computer can raise an alert indicating that a possible water leak has occurred.

In one embodiment, the sensor 201 includes a fire-extinguisher tamper sensor is provided to the sensor unit 102. The fire-extinguisher tamper sensor reports tampering with or use of a fire-extinguisher. In one embodiment the fire-extinguisher tamper sensor reports that the fire extinguisher has been removed from its mounting, that a fire extinguisher compartment has been opened, and/or that a safety lock on the fire extinguisher has been removed.

It will be evident to those skilled in the art that the invention is not limited to the details of the foregoing illustrated embodiments and that the present invention may be embodied in other specific forms without departing from the spirit or essential attributed thereof; furthermore, various omissions, substitutions and changes may be made without departing from the spirit of the inventions. For example, although specific embodiments are described in terms of the 900 MHz frequency band, one of ordinary skill in the art will recognize that frequency bands above and below 900 MHz can be used as well. The wireless system can be configured to operate on one or more frequency bands, such as, for example, the HF band, the VHF band, the UHF band, the Microwave band, the Millimeter wave band, etc. One of ordinary skill in the art will further recognize that techniques other than spread spectrum can also be used and/or can be use instead spread spectrum. The modulation uses is not limited to any particular modulation method, such that modulation scheme used can be, for example, frequency modulation, phase modulation, amplitude modulation, combinations thereof, etc. The foregoing description of the embodiments is therefore to be considered in all respects as illustrative and not restrictive, with the scope of the invention being delineated by the appended claims and their equivalents.

What is claimed is:

1. A wireless smoke sensor device that functions as part of an in-building wireless sensor system, comprising:
    a wireless transceiver capable of wirelessly transmitting and receiving information to and from an electronic device located remotely from the wireless device, wherein the electronic device and the wireless device are configured to be installed within a building as part of the in-building wireless sensor system;
    a smoke sensor configured to take smoke measurements;
    a controller operatively coupled to the wireless transceiver and the smoke sensor and configured to:
        continuously operate the wireless device in a sleep mode whereby the wireless transceiver is inoperable to transmit or receive information and consumption of power from the battery is lower than when the wireless device operates in an awake mode;
periodically and temporarily switch the operation of the wireless device from the sleep mode to the awake mode whereby, while in the awake mode, the wireless transceiver is configured to transmit one or more smoke measurements measured using the smoke sensor of the wireless device as one or more encrypted packets, each encrypted packet comprising a first checksum and first authenticity code for use in verifying an authenticity of the packet; and
in response to a received, encrypted message comprising a second checksum and a second authenticity code, alter a period at which the wireless device switches from the sleep mode to the awake mode such that during a first period the wireless device operates in the sleep mode for a first amount of time before temporarily switching from the sleep mode to the awake mode and that during a second period the wireless device operates in the sleep mode for a second amount of time before temporarily switching from the sleep mode to the awake mode, the second amount of time being greater than the first amount of time.

2. The wireless smoke sensor device of claim 1, wherein the controller is configured to alter the period at which the wireless device switches from the sleep mode to the awake mode in response to receiving an instruction from the electronic device via the wireless transceiver, the period being altered from an old period to a new period, the new period being defined by the instruction.

3. The wireless smoke sensor device of claim 1, wherein the controller is further configured to cause the wireless device to switch from the sleep mode to the awake mode in response to receiving an instruction from the electronic device via the wireless transceiver, the instruction instructing the wireless device to switch from the sleep mode to the awake mode.

4. The wireless smoke sensor of claim 1, wherein the controller is further configured to:
compare the one or more smoke measurements to a threshold value;
determine whether the one or more smoke measurements are outside of the threshold value; and
upon determining that the one or more smoke measurements are outside of the threshold value:
switch from the sleep mode to the awake mode, regardless of the periodic switching from the sleep mode to the awake mode;
while in the awake mode, communicate, to the electronic device via the wireless transceiver, information indicative of the one or more smoke measurements being outside of the threshold value; and
after communicating the information indicative of the one or more smoke measurements being outside of the threshold value, returning from the awake mode back to the sleep mode.

5. The wireless smoke sensor device of claim 4, wherein the controller is further configured to listen for instructions while in the awake mode, after communicating the information indicative of the one or more smoke measurements being outside of the threshold value, and before returning back to the sleep mode.

6. The wireless smoke sensor device of claim 1, wherein the controller is further configured to cause the wireless device to listen for one or more instructions while operating in the awake mode, and, in response to receiving the one or more instructions, perform one or more functions requested by the one or more instructions while operating in the awake mode.

7. A wireless temperature sensor device that functions as part of an in-building wireless sensor system, comprising:
a wireless transceiver capable of wirelessly transmitting and receiving information to and from an electronic device located remotely from the wireless device, wherein the electronic device and the wireless device are configured to be installed within a building as part of the in-building wireless sensor system;
a temperature sensor configured to take temperature measurements;
a controller operatively coupled to the wireless transceiver and the temperature sensor and configured to:
continuously operate the wireless device in a sleep mode whereby the wireless transceiver is inoperable to transmit or receive information and consumption of power from the battery is lower than when the wireless device operates in an awake mode;
periodically and temporarily switch the operation of the wireless device from the sleep mode to the awake mode whereby, while in the awake mode, the wireless transceiver is configured to transmit one or more temperature measurements measured using the temperature sensor of the wireless device as one or more encrypted packets, each encrypted packet comprising a first checksum and first authenticity code for use in verifying an authenticity of the packet; and
in response to a received, encrypted message comprising a second checksum and a second authenticity code, alter a period at which the wireless device switches from the sleep mode to the awake mode such that during a first period the wireless device operates in the sleep mode for a first amount of time before temporarily switching from the sleep mode to the awake mode and that during a second period the wireless device operates in the sleep mode for a second amount of time before temporarily switching from the sleep mode to the awake mode, the second amount of time being greater than the first amount of time.

8. The wireless temperature sensor device of claim 7, wherein the controller is configured to alter the period at which the wireless device switches from the sleep mode to the awake mode in response to receiving an instruction from the electronic device via the wireless transceiver, the period being altered from an old period to a new period, the new period being defined by the instruction.

9. The wireless temperature sensor device of claim 7, wherein the controller is further configured to cause the wireless device to switch from the sleep mode to the awake mode in response to receiving an instruction from the electronic device via the wireless transceiver, the instruction instructing the wireless device to switch from the sleep mode to the awake mode.

10. The wireless temperature sensor device of claim 7, wherein the controller is further configured to:
compare the one or more temperature measurements to a threshold value;
determine whether the one or more temperature measurements are outside of the threshold value; and
upon determining that the one or more temperature measurements are outside of the threshold value:
switch from the sleep mode to the awake mode, regardless of the periodic switching from the sleep mode to the awake mode;
while in the awake mode, communicate, to the electronic device via the wireless transceiver, information indicative of the one or more temperature measurements being outside of the threshold value; and after communicating the information indicative of the one or more temperature measurements being outside of the threshold value, returning from the awake mode back to the sleep mode.

11. The wireless temperature sensor device of claim 10, wherein the controller is further configured to listen for instructions while in the awake mode, after communicating the information indicative of the one or more temperature measurements being outside of the threshold value, and before returning back to the sleep mode.

12. The wireless temperature sensor device of claim 7, wherein the controller is further configured to cause the wireless device to listen for one or more instructions while operating in the awake mode, and, in response to receiving the one or more instructions, perform one or more functions requested by the one or more instructions while operating in the awake mode.

13. A wireless humidity sensor device that functions as part of an in-building wireless sensor system, comprising:
 a wireless transceiver capable of wirelessly transmitting and receiving information to and from an electronic device located remotely from the wireless device, wherein the electronic device and the wireless device are configured to be installed within a building as part of the in-building wireless sensor system;
 a humidity sensor configured to take humidity measurements;
 a controller operatively coupled to the wireless transceiver and the humidity sensor and configured to:
  continuously operate the wireless device in a sleep mode whereby the wireless transceiver is inoperable to transmit or receive information and consumption of power from the battery is lower than when the wireless device operates in an awake mode;
  periodically and temporarily switch the operation of the wireless device from the sleep mode to the awake mode whereby, while in the awake mode, the wireless transceiver is configured to transmit one or more humidity measurements measured using the humidity sensor of the wireless device as one or more encrypted packets, each encrypted packet comprising a first checksum and first authenticity code for use in verifying an authenticity of the packet; and
  in response to a received, encrypted message comprising a second checksum and a second authenticity code, alter a period at which the wireless device switches from the sleep mode to the awake mode such that during a first period the wireless device operates in the sleep mode for a first amount of time before temporarily switching from the sleep mode to the awake mode and that during a second period the wireless device operates in the sleep mode for a second amount of time before temporarily switching from the sleep mode to the awake mode, the second amount of time being greater than the first amount of time.

14. The wireless humidity sensor device of claim 13, wherein the controller is configured to alter the period at which the wireless device switches from the sleep mode to the awake mode in response to receiving an instruction from the electronic device via the wireless transceiver, the period being altered from an old period to a new period, the new period being defined by the instruction.

15. The wireless humidity sensor device of claim 13, wherein the controller is further configured to cause the wireless device to switch from the sleep mode to the awake mode in response to receiving an instruction from the electronic device via the wireless transceiver, the instruction instructing the wireless device to switch from the sleep mode to the awake mode.

16. The wireless humidity sensor device of claim 13, wherein the controller is further configured to:
 compare the one or more humidity measurements to a threshold value;
 determine whether the one or more humidity measurements are outside of the threshold value; and
 upon determining that the one or more humidity measurements are outside of the threshold value:
 switch from the sleep mode to the awake mode, regardless of the periodic switching from the sleep mode to the awake mode;
 while in the awake mode, communicate, to the electronic device via the wireless transceiver, information indicative of the one or more humidity measurements being outside of the threshold value; and
 after communicating the information indicative of the one or more humidity measurements being outside of the threshold value, returning from the awake mode back to the sleep mode.

17. The wireless humidity sensor device of claim 16, wherein the controller is further configured to listen for instructions while in the awake mode, after communicating the information indicative of the one or more humidity measurements being outside of the threshold value, and before returning back to the sleep mode.

18. The wireless humidity sensor device of claim 13, wherein the controller is further configured to cause the wireless device to listen for one or more instructions while operating in the awake mode, and, in response to receiving the one or more instructions, perform one or more functions requested by the one or more instructions while operating in the awake mode.

19. A wireless water sensor device that functions as part of an in-building wireless sensor system, comprising:
 a wireless transceiver capable of wirelessly transmitting and receiving information to and from an electronic device located remotely from the wireless device, wherein the electronic device and the wireless device are configured to be installed within a building as part of the in-building wireless sensor system;
 a water sensor configured to take water measurements;
 a controller operatively coupled to the wireless transceiver and the water sensor and configured to:
  continuously operate the wireless device in a sleep mode whereby the wireless transceiver is inoperable to transmit or receive information and consumption of power from the battery is lower than when the wireless device operates in an awake mode;
  periodically and temporarily switch the operation of the wireless device from the sleep mode to the awake mode whereby, while in the awake mode, the wireless transceiver is configured to transmit one or more water measurements measured using the water sensor of the wireless device as one or more encrypted packets, each encrypted packet comprising a first checksum and first authenticity code for use in verifying an authenticity of the packet; and
  in response to a received, encrypted message comprising a second checksum and a second authenticity code, alter a period at which the wireless device switches from the sleep mode to the awake mode such that during a first period the wireless device operates in the sleep mode for a first amount of time before temporarily switching from the sleep mode to the awake mode and that during a second period the wireless device operates in the sleep mode for a second amount of time before temporarily switching from the sleep mode to the awake mode, the second amount of time being greater than the first amount of time.

20. The wireless water sensor device of claim 19, wherein the controller is further configured to:
compare the one or more water measurements to a threshold value;
determine whether the one or more water measurements are outside of the threshold value; and
upon determining that the one or more water measurements are outside of the threshold value:
switch from the sleep mode to the awake mode, regardless of the periodic switching from the sleep mode to the awake mode;
while in the awake mode, communicate, to the electronic device via the wireless transceiver, information indicative of the one or more water measurements being outside of the threshold value; and
after communicating the information indicative of the one or more water measurements being outside of the threshold value, returning from the awake mode back to the sleep mode.

21. The wireless water sensor device of claim 20, wherein the controller is further configured to listen for instructions while in the awake mode, after communicating the information indicative of the one or more water measurements being outside of the threshold value, and before returning back to the sleep mode.

22. A wireless carbon monoxide sensor device that functions as part of an in-building wireless sensor system, comprising:
a wireless transceiver capable of wirelessly transmitting and receiving information to and from an electronic device located remotely from the wireless device, wherein the electronic device and the wireless device are configured to be installed within a building as part of the in-building wireless sensor system;
a carbon monoxide sensor configured to take carbon monoxide measurements;
a controller operatively coupled to the wireless transceiver and the carbon monoxide sensor and configured to:
continuously operate the wireless device in a sleep mode whereby the wireless transceiver is inoperable to transmit or receive information and consumption of power from the battery is lower than when the wireless device operates in an awake mode;
periodically and temporarily switch the operation of the wireless device from the sleep mode to the awake mode whereby, while in the awake mode, the wireless transceiver is configured to transmit one or more carbon monoxide measurements measured using the carbon monoxide sensor of the wireless device as one or more encrypted packets, each encrypted packet comprising a first checksum and first authenticity code for use in verifying an authenticity of the packet; and
in response to a received, encrypted message comprising a second checksum and a second authenticity code, alter a period at which the wireless device switches from the sleep mode to the awake mode such that during a first period the wireless device operates in the sleep mode for a first amount of time before temporarily switching from the sleep mode to the awake mode and that during a second period the wireless device operates in the sleep mode for a second amount of time before temporarily switching from the sleep mode to the awake mode, the second amount of time being greater than the first amount of time.

23. The wireless carbon monoxide sensor device of claim 22, wherein the controller is configured to alter the period at which the wireless device switches from the sleep mode to the awake mode in response to receiving an instruction from the electronic device via the wireless transceiver, the period being altered from an old period to a new period, the new period being defined by the instruction.

24. The wireless carbon monoxide sensor device of claim 22, wherein the controller is further configured to cause the wireless device to switch from the sleep mode to the awake mode in response to receiving an instruction from the electronic device via the wireless transceiver, the instruction instructing the wireless device to switch from the sleep mode to the awake mode.

25. The wireless carbon monoxide sensor device of claim 22, wherein the controller is further configured to:
compare the one or more carbon monoxide measurements to a threshold value;
determine whether the one or more carbon monoxide measurements are outside of the threshold value; and
upon determining that the one or more carbon monoxide measurements are outside of the threshold value:
switch from the sleep mode to the awake mode, regardless of the periodic switching from the sleep mode to the awake mode;
while in the awake mode, communicate, to the electronic device via the wireless transceiver, information indicative of the one or more carbon monoxide measurements being outside of the threshold value; and
after communicating the information indicative of the one or more carbon monoxide measurements being outside of the threshold value, returning from the awake mode back to the sleep mode.

26. The wireless carbon monoxide sensor device of claim 25, wherein the controller is further configured to listen for instructions while in the awake mode, after communicating the information indicative of the one or more carbon monoxide measurements being outside of the threshold value, and before returning back to the sleep mode.

27. The wireless carbon monoxide sensor device of claim 22, wherein the controller is further configured to cause the wireless device to listen for one or more instructions while operating in the awake mode, and, in response to receiving the one or more instructions, perform one or more functions requested by the one or more instructions while operating in the awake mode.

28. A method for using a wireless smoke sensor device that functions as part of an in-building wireless sensor system, comprising:
continuously operating the wireless device in a sleep mode such that the wireless transceiver is inoperable to transmit or receive information and consumption of power from the battery is lower than when the wireless device operates in an awake mode;
switching, periodically and temporarily, the operation of the wireless device from the sleep mode to the awake mode;
transmitting, by the wireless transceiver, while in the awake mode, one or more smoke measurements measured using a smoke sensor of the wireless device as one or more encrypted packets, each encrypted packet comprising a first checksum and first authenticity code for use in verifying an authenticity of the packet, wherein:

transmission of the one or more smoke measurements are performed using a wireless transceiver capable of wirelessly transmitting and receiving information to and from an electronic device located remotely from the wireless device; and receiving, by the wireless transceiver, an encrypted message comprising a second checksum and a second authenticity code; and in response to the received, encrypted message comprising the second checksum and the second authenticity code, altering a period at which the wireless device switches from the sleep mode to the awake mode such that during a first period the wireless device operates in the sleep mode for a first amount of time before temporarily switching from the sleep mode to the awake mode and that during a second period the wireless device operates in the sleep mode for a second amount of time before temporarily switching from the sleep mode to the awake mode, the second amount of time being greater than the first amount of time.

29. The method for using the wireless smoke sensor device of claim 28, further comprising:

causing the wireless device to remain in the awake mode until it wirelessly receives an acknowledgement that the one or more smoke measurements were received; and in response to receiving the acknowledgement that the one or more smoke measurements were received, causing the wireless device to enter again into the sleep mode.

30. The method for using the wireless smoke sensor device of claim 28, further comprising:

determining, prior to wirelessly communicating the one or more smoke measurements, an available radio frequency channel, wherein the one or more smoke measurements is wireless communicated from the wireless device to the electronic device located remote from the wireless device over the available radio frequency channel.

31. The method for using the wireless smoke sensor device of claim 30, further comprising:

determining, by the wireless device, that a certain radio frequency channel is in use, and selecting, by the wireless device, an alternative radio frequency channel that is not in use to wirelessly communicate the information indicative of the sensor data.

32. The method for using the wireless smoke sensor device of claim 31, wherein transmitting while in the awake mode, the one or more smoke measurements comprises:

wirelessly communicating, on the alternative radio frequency channel, the one or more smoke measurements utilizing spread-spectrum communication techniques; and the method further comprising:

wirelessly receiving, while in the awake mode and using the spread-spectrum communication techniques, information from the electronic device including instructions regarding subsequent operation of the wireless device.

33. The method for using the wireless smoke sensor device of claim 28, further comprising:

comparing, by the wireless device, the one or more smoke measurements to a threshold value;

determining, by the wireless device, whether the one or more smoke measurements are outside of the threshold value; and upon determining that the one or more smoke measurements are outside of the threshold value:

switching from the sleep mode to the awake mode, regardless of the periodic switching from the sleep mode to the awake mode;

while in the awake mode, communicating, to the electronic device via the wireless transceiver, information indicative of the one or more smoke measurements being outside of the threshold value; and after communicating the information indicative of the one or more smoke measurements being outside of the threshold value, returning from the awake mode back to the sleep mode.

34. A method for using a wireless temperature sensor device that functions as part of an in-building wireless sensor system, comprising:

continuously operating the wireless device in a sleep mode such that the wireless transceiver is inoperable to transmit or receive information and consumption of power from the battery is lower than when the wireless device operates in an awake mode;

switching, periodically and temporarily, the operation of the wireless device from the sleep mode to the awake mode;

transmitting, by the wireless transceiver, while in the awake mode, one or more temperature measurements measured using a temperature sensor of the wireless device as one or more encrypted packets, each encrypted packet comprising a first checksum and first authenticity code for use in verifying an authenticity of the packet, wherein:

transmission of the one or more temperature measurements are performed using a wireless transceiver capable of wirelessly transmitting and receiving information to and from an electronic device located remotely from the wireless device; and receiving, by the wireless transceiver, an encrypted message comprising a second checksum and a second authenticity code; and in response to the received, encrypted message comprising the second checksum and the second authenticity code, altering a period at which the wireless device switches from the sleep mode to the awake mode such that during a first period the wireless device operates in the sleep mode for a first amount of time before temporarily switching from the sleep mode to the awake mode and that during a second period the wireless device operates in the sleep mode for a second amount of time before temporarily switching from the sleep mode to the awake mode, the second amount of time being greater than the first amount of time.

35. The method for using the wireless temperature sensor device of claim 34, further comprising:

causing the wireless device to remain in the awake mode until it wirelessly receives an acknowledgement that the one or more temperature measurements were received; and in response to receiving the acknowledgement that the one or more temperature measurements were received, causing the wireless device to enter again into the sleep mode.

36. The method for using the wireless temperature sensor device of claim 34, further comprising:

determining, prior to wirelessly communicating the one or more temperature measurements, an available radio frequency channel, wherein the one or more temperature measurements is wireless communicated from the wireless device to the electronic device located remote from the wireless device over the available radio frequency channel.

37. The method for using the wireless temperature sensor device of claim 36, further comprising:

determining, by the wireless device, that a certain radio frequency channel is in use, and selecting, by the wireless device, an alternative radio frequency channel that is not in use to wirelessly communicate the information indicative of the sensor data.

38. The method for using the wireless temperature sensor device of claim 37, wherein transmitting while in the awake mode, the one or more temperature measurements comprises:

wirelessly communicating, on the alternative radio frequency channel, the one or more temperature measurements utilizing spread-spectrum communication techniques; and the method further comprising:

wirelessly receiving, while in the awake mode and using the spread-spectrum communication techniques, information from the electronic device including instructions regarding subsequent operation of the wireless device.

39. The method for using the wireless temperature sensor device of claim 34, further comprising:

comparing, by the wireless device, the one or more temperature measurements to a threshold value;

determining, by the wireless device, whether the one or more temperature measurements are outside of the threshold value; and upon determining that the one or more temperature measurements are outside of the threshold value:

switching from the sleep mode to the awake mode, regardless of the periodic switching from the sleep mode to the awake mode;

while in the awake mode, communicating, to the electronic device via the wireless transceiver, information indicative of the one or more temperature measurements being outside of the threshold value; and after communicating the information indicative of the one or more temperature measurements being outside of the threshold value, returning from the awake mode back to the sleep mode.

40. A method for using a wireless humidity sensor device that functions as part of an in-building wireless sensor system, comprising:

continuously operating the wireless device in a sleep mode such that the wireless transceiver is inoperable to transmit or receive information and consumption of power from the battery is lower than when the wireless device operates in an awake mode;

switching, periodically and temporarily, the operation of the wireless device from the sleep mode to the awake mode;

transmitting, by the wireless transceiver, while in the awake mode, one or more humidity measurements measured using a humidity sensor of the wireless device as one or more encrypted packets, each encrypted packet comprising a first checksum and first authenticity code for use in verifying an authenticity of the packet, wherein:

transmission of the one or more humidity measurements are performed using a wireless transceiver capable of wirelessly transmitting and receiving information to and from an electronic device located remotely from the wireless device; and receiving, by the wireless transceiver, an encrypted message comprising a second checksum and a second authenticity code; and in response to the received, encrypted message comprising the second checksum and the second authenticity code, altering a period at which the wireless device switches from the sleep mode to the awake mode such that during a first period the wireless device operates in the sleep mode for a first amount of time before temporarily switching from the sleep mode to the awake mode and that during a second period the wireless device operates in the sleep mode for a second amount of time before temporarily switching from the sleep mode to the awake mode, the second amount of time being greater than the first amount of time.

41. The method for using the wireless humidity sensor device of claim 40, further comprising:

causing the wireless device to remain in the awake mode until it wirelessly receives an acknowledgement that the one or more humidity measurements were received; and in response to receiving the acknowledgement that the one or more humidity measurements were received, causing the wireless device to enter again into the sleep mode.

42. The method for using the wireless humidity sensor device of claim 40, further comprising:

determining, prior to wirelessly communicating the one or more humidity measurements, an available radio frequency channel, wherein the one or more humidity measurements is wireless communicated from the wireless device to the electronic device located remote from the wireless device over the available radio frequency channel.

43. The method for using the wireless humidity sensor device of claim 42, further comprising:

determining, by the wireless device, that a certain radio frequency channel is in use, and selecting, by the wireless device, an alternative radio frequency channel that is not in use to wirelessly communicate the information indicative of the sensor data.

44. The method for using the wireless humidity sensor device of claim 43, wherein transmitting while in the awake mode, the one or more humidity measurements comprises:

wirelessly communicating, on the alternative radio frequency channel, the one or more humidity measurements utilizing spread-spectrum communication techniques;

and the method further comprising:

wirelessly receiving, while in the awake mode and using the spread-spectrum communication techniques, information from the electronic device including instructions regarding subsequent operation of the wireless device.

45. The method for using the wireless humidity sensor device of claim 40, further comprising:

comparing, by the wireless device, the one or more humidity measurements to a threshold value;

determining, by the wireless device, whether the one or more humidity measurements are outside of the threshold value; and upon determining that the one or more humidity measurements are outside of the threshold value:

switching from the sleep mode to the awake mode, regardless of the periodic switching from the sleep mode to the awake mode;

while in the awake mode, communicating, to the electronic device via the wireless transceiver, information indicative of the one or more humidity measurements being outside of the threshold value; and after communicating the information indicative of the one or more humidity measurements being outside of the threshold value, returning from the awake mode back to the sleep mode.

46. A method for using a wireless water sensor device that functions as part of an in-building wireless sensor system, comprising:

continuously operating the wireless device in a sleep mode such that the wireless transceiver is inoperable to transmit or receive information and consumption of power from the battery is lower than when the wireless device operates in an awake mode;

switching, periodically and temporarily, the operation of the wireless device from the sleep mode to the awake mode;

transmitting, by the wireless transceiver, while in the awake mode, one or more water measurements measured using a water sensor of the wireless device as one or more encrypted packets, each encrypted packet comprising a first checksum and first authenticity code for use in verifying an authenticity of the packet, wherein:

transmission of the one or more water measurements are performed using a wireless transceiver capable of wirelessly transmitting and receiving information to and from an electronic device located remotely from the wireless device; and receiving, by the wireless transceiver, an encrypted message comprising a second checksum and a second authenticity code; and in response to the received, encrypted message comprising the second checksum and the second authenticity code, altering a period at which the wireless device switches from the sleep mode to the awake mode such that during a first period the wireless device operates in the sleep mode for a first amount of time before temporarily switching from the sleep mode to the awake mode and that during a second period the wireless device operates in the sleep mode for a second amount of time before temporarily switching from the sleep mode to the awake mode, the second amount of time being greater than the first amount of time.

47. The method for using the wireless water sensor device of claim 46, further comprising:

comparing, by the wireless device, the one or more water measurements to a threshold value;

determining, by the wireless device, whether the one or more water measurements are outside of the threshold value; and upon determining that the one or more water measurements are outside of the threshold value:

switching from the sleep mode to the awake mode, regardless of the periodic switching from the sleep mode to the awake mode;

while in the awake mode, communicating, to the electronic device via the wireless transceiver, information indicative of the one or more water measurements being outside of the threshold value; and after communicating the information indicative of the one or more water measurements being outside of the threshold value, returning from the awake mode back to the sleep mode.

48. A method for using a wireless carbon monoxide device that functions as part of an in-building wireless sensor system, comprising:

continuously operating the wireless device in a sleep mode such that the wireless transceiver is inoperable to transmit or receive information and consumption of power from the battery is lower than when the wireless device operates in an awake mode;

switching, periodically and temporarily, the operation of the wireless device from the sleep mode to the awake mode;

transmitting, by the wireless transceiver, while in the awake mode, one or more carbon monoxide measurements measured using a carbon monoxide sensor of the wireless device as one or more encrypted packets, each encrypted packet comprising a first checksum and first authenticity code for use in verifying an authenticity of the packet, wherein:

transmission of the one or more carbon monoxide measurements are performed using a wireless transceiver capable of wirelessly transmitting and receiving information to and from an electronic device located remotely from the wireless device; and receiving, by the wireless transceiver, an encrypted message comprising a second checksum and a second authenticity code; and in response to the received, encrypted message comprising the second checksum and the second authenticity code, altering a period at which the wireless device switches from the sleep mode to the awake mode such that during a first period the wireless device operates in the sleep mode for a first amount of time before temporarily switching from the sleep mode to the awake mode and that during a second period the wireless device operates in the sleep mode for a second amount of time before temporarily switching from the sleep mode to the awake mode, the second amount of time being greater than the first amount of time.

49. The method for using the wireless carbon monoxide device of claim 48, further comprising:

causing the wireless device to remain in the awake mode until it wirelessly receives an acknowledgement that the one or more carbon monoxide measurements were received; and in response to receiving the acknowledgement that the one or more carbon monoxide measurements were received, causing the wireless device to enter again into the sleep mode.

50. The method for using the wireless carbon monoxide device of claim 48, further comprising:

determining, prior to wirelessly communicating the one or more carbon monoxide measurements, an available radio frequency channel, wherein the one or more carbon monoxide measurements is wireless communicated from the wireless device to the electronic device located remote from the wireless device over the available radio frequency channel.

51. The method for using the wireless carbon monoxide device of claim 48, further comprising:

comparing, by the wireless device, the one or more carbon monoxide measurements to a threshold value;

determining, by the wireless device, whether the one or more carbon monoxide measurements are outside of the threshold value; and upon determining that the one or more carbon monoxide measurements are outside of the threshold value:

switching from the sleep mode to the awake mode, regardless of the periodic switching from the sleep mode to the awake mode;

while in the awake mode, communicating, to the electronic device via the wireless transceiver, information indicative of the one or more carbon monoxide measurements being outside of the threshold value; and after communicating the information indicative of the one or more carbon monoxide measurements being outside of the threshold value, returning from the awake mode back to the sleep mode.

52. A wireless security sensor device that functions as part of an in-building wireless sensor system, comprising:

a wireless transceiver capable of wirelessly transmitting and receiving information to and from an electronic device located remotely from the wireless device, wherein the electronic device and the wireless device are configured to be installed within a building as part of the in-building wireless sensor system;

a security sensor configured to take security measurements;

a controller operatively coupled to the wireless transceiver and the security sensor and configured to:

continuously operate the wireless device in a sleep mode whereby the wireless transceiver is inoperable to transmit or receive information and consumption of power from the battery is lower than when the wireless device operates in an awake mode;

periodically and temporarily switch the operation of the wireless device from the sleep mode to the awake mode whereby, while in the awake mode, the wireless transceiver is configured to transmit one or more security measurements measured using the security sensor of the wireless device as one or more encrypted packets, each encrypted packet comprising a first checksum and first authenticity code for use in verifying an authenticity of the packet; and in response to a received, encrypted message comprising a second checksum and a second authenticity code, alter a period at which the wireless device switches from the sleep mode to the awake mode such that during a first period the wireless device operates in the sleep mode for a first amount of time before temporarily switching from the sleep mode to the awake mode and that during a second period the wireless device operates in the sleep mode for a second amount of time before temporarily switching from the sleep mode to the awake mode, the second amount of time being greater than the first amount of time.

53. The wireless security sensor device of claim 52, wherein the controller is configured to alter the period at which the wireless device switches from the sleep mode to the awake mode in response to receiving an instruction from the electronic device via the wireless transceiver, the period being altered from an old period to a new period, the new period being defined by the instruction.

54. The wireless security sensor device of claim 52, wherein the controller is further configured to cause the wireless device to switch from the sleep mode to the awake mode in response to receiving an instruction from the electronic device via the wireless transceiver, the instruction instructing the wireless device to switch from the sleep mode to the awake mode.

55. The wireless security sensor device of claim 52, wherein the controller is further configured to:

compare the one or more security measurements to a threshold value;

determine whether the one or more security measurements are outside of the threshold value; and upon determining that the one or more security measurements are outside of the threshold value:

switch from the sleep mode to the awake mode, regardless of the periodic switching from the sleep mode to the awake mode;

while in the awake mode, communicate, to the electronic device via the wireless transceiver, information indicative of the one or more security measurements being outside of the threshold value; and after communicating the information indicative of the one or more security measurements being outside of the threshold value, returning from the awake mode back to the sleep mode.

56. The wireless security sensor device of claim 55, wherein the controller is further configured to listen for instructions while in the awake mode, after communicating the information indicative of the one or more security measurements being outside of the threshold value, and before returning back to the sleep mode.

57. The wireless security sensor device of claim 52, wherein the controller is further configured to cause the wireless device to listen for one or more instructions while operating in the awake mode, and, in response to receiving the one or more instructions, perform one or more functions requested by the one or more instructions while operating in the awake mode.

58. A wireless door motion sensor device that functions as part of an in-building wireless sensor system, comprising:

a wireless transceiver capable of wirelessly transmitting and receiving information to and from an electronic device located remotely from the wireless device, wherein the electronic device and the wireless device are configured to be installed within a building as part of the in-building wireless sensor system;

a door motion sensor configured to take door motion measurements;

a controller operatively coupled to the wireless transceiver and the door motion sensor and configured to:

continuously operate the wireless device in a sleep mode whereby the wireless transceiver is inoperable to transmit or receive information and consumption of power from the battery is lower than when the wireless device operates in an awake mode;

periodically and temporarily switch the operation of the wireless device from the sleep mode to the awake mode whereby, while in the awake mode, the wireless transceiver is configured to transmit one or more door motion measurements measured using the door motion sensor of the wireless device as one or more encrypted packets, each encrypted packet comprising a first checksum and first authenticity code for use in verifying an authenticity of the packet; and in response to a received, encrypted message comprising a second checksum and a second authenticity code, alter a period at which the wireless device switches from the sleep mode to the awake mode such that during a first period the wireless device operates in the sleep mode for a first amount of time before temporarily switching from the sleep mode to the awake mode and that during a second period the wireless device operates in the sleep mode for a second amount of time before temporarily switching from the sleep mode to the awake mode, the second amount of time being greater than the first amount of time.

59. The wireless door motion sensor device of claim 58, wherein the controller is configured to alter the period at which the wireless device switches from the sleep mode to the awake mode in response to receiving an instruction from the electronic device via the wireless transceiver, the period being altered from an old period to a new period, the new period being defined by the instruction.

60. The wireless door motion sensor device of claim 58, wherein the controller is further configured to cause the wireless device to switch from the sleep mode to the awake mode in response to receiving an instruction from the electronic device via the wireless transceiver, the instruction instructing the wireless device to switch from the sleep mode to the awake mode.

61. The wireless door motion sensor device of claim 58, wherein the controller is further configured to:
compare the one or more door motion measurements to a threshold value;
determine whether the one or more door motion measurements are outside of the threshold value; and
upon determining that the one or more door motion measurements are outside of the threshold value:
switch from the sleep mode to the awake mode, regardless of the periodic switching from the sleep mode to the awake mode;
while in the awake mode, communicate, to the electronic device via the wireless transceiver, information indicative of the one or more door motion measurements being outside of the threshold value; and
after communicating the information indicative of the one or more door motion measurements being outside of the threshold value, returning from the awake mode back to the sleep mode.

62. The wireless door motion sensor device of claim 61, wherein the controller is further configured to listen for instructions while in the awake mode, after communicating the information indicative of the one or more door motion measurements being outside of the threshold value, and before returning back to the sleep mode.

63. The wireless door motion sensor device of claim 58, wherein the controller is further configured to cause the wireless device to listen for one or more instructions while operating in the awake mode, and, in response to receiving the one or more instructions, perform one or more functions requested by the one or more instructions while operating in the awake mode.

64. A wireless window breakage sensor device that functions as part of an in-building wireless sensor system, comprising:
a wireless transceiver capable of wirelessly transmitting and receiving information to and from an electronic device located remotely from the wireless device, wherein the electronic device and the wireless device are configured to be installed within a building as part of the in-building wireless sensor system;
a window breakage sensor configured to take window breakage measurements;
a controller operatively coupled to the wireless transceiver and the window breakage sensor and configured to:
continuously operate the wireless device in a sleep mode whereby the wireless transceiver is inoperable to transmit or receive information and consumption of power from the battery is lower than when the wireless device operates in an awake mode;
periodically and temporarily switch the operation of the wireless device from the sleep mode to the awake mode whereby, while in the awake mode, the wireless transceiver is configured to transmit one or more window breakage measurements measured using the window breakage sensor of the wireless device as one or more encrypted packets, each encrypted packet comprising a first checksum and first authenticity code for use in verifying an authenticity of the packet; and
in response to a received, encrypted message comprising a second checksum and a second authenticity code, alter a period at which the wireless device switches from the sleep mode to the awake mode such that during a first period the wireless device operates in the sleep mode for a first amount of time before temporarily switching from the sleep mode to the awake mode and that during a second period the wireless device operates in the sleep mode for a second amount of time before temporarily switching from the sleep mode to the awake mode, the second amount of time being greater than the first amount of time.

65. The wireless window breakage sensor device of claim 64, wherein the controller is configured to alter the period at which the wireless device switches from the sleep mode to the awake mode in response to receiving an instruction from the electronic device via the wireless transceiver, the period being altered from an old period to a new period, the new period being defined by the instruction.

66. The wireless window breakage sensor device of claim 64, wherein the controller is further configured to cause the wireless device to switch from the sleep mode to the awake mode in response to receiving an instruction from the electronic device via the wireless transceiver, the instruction instructing the wireless device to switch from the sleep mode to the awake mode.

67. The wireless window breakage sensor device of claim 64, wherein the controller is further configured to:
compare the one or more window breakage measurements to a threshold value;
determine whether the one or more window breakage measurements are outside of the threshold value; and
upon determining that the one or more window breakage measurements are outside of the threshold value:
switch from the sleep mode to the awake mode, regardless of the periodic switching from the sleep mode to the awake mode;
while in the awake mode, communicate, to the electronic device via the wireless transceiver, information indicative of the one or more window breakage measurements being outside of the threshold value; and
after communicating the information indicative of the one or more window breakage measurements being outside of the threshold value, returning from the awake mode back to the sleep mode.

68. The wireless window breakage sensor device of claim 67, wherein the controller is further configured to listen for instructions while in the awake mode, after communicating the information indicative of the one or more window breakage measurements being outside of the threshold value, and before returning back to the sleep mode.

69. The wireless window breakage sensor device of claim 64, wherein the controller is further configured to cause the wireless device to listen for one or more instructions while operating in the awake mode, and, in response to receiving the one or more instructions, perform one or more functions requested by the one or more instructions while operating in the awake mode.

70. A wireless window motion sensor device that functions as part of an in-building wireless sensor system, comprising:
a wireless transceiver capable of wirelessly transmitting and receiving information to and from an electronic device located remotely from the wireless device, wherein the electronic device and the wireless device are configured to be installed within a building as part of the in-building wireless sensor system;
a window motion sensor configured to take window motion measurements;
a controller operatively coupled to the wireless transceiver and the window motion sensor and configured to:
continuously operate the wireless device in a sleep mode whereby the wireless transceiver is inoperable to transmit or receive information and consumption of power from the battery is lower than when the wireless device operates in an awake mode;

periodically and temporarily switch the operation of the wireless device from the sleep mode to the awake mode whereby, while in the awake mode, the wireless transceiver is configured to transmit one or more window motion measurements measured using the window motion sensor of the wireless device as one or more encrypted packets, each encrypted packet comprising a first checksum and first authenticity code for use in verifying an authenticity of the packet; and in response to a received, encrypted message comprising a second checksum and a second authenticity code, alter a period at which the wireless device switches from the sleep mode to the awake mode such that during a first period the wireless device operates in the sleep mode for a first amount of time before temporarily switching from the sleep mode to the awake mode and that during a second period the wireless device operates in the sleep mode for a second amount of time before temporarily switching from the sleep mode to the awake mode, the second amount of time being greater than the first amount of time.

71. The wireless window motion sensor device of claim 70, wherein the controller is configured to alter the period at which the wireless device switches from the sleep mode to the awake mode in response to receiving an instruction from the electronic device via the wireless transceiver, the period being altered from an old period to a new period, the new period being defined by the instruction.

72. The wireless window motion sensor device of claim 70, wherein the controller is further configured to cause the wireless device to switch from the sleep mode to the awake mode in response to receiving an instruction from the electronic device via the wireless transceiver, the instruction instructing the wireless device to switch from the sleep mode to the awake mode.

73. The wireless window motion sensor device of claim 70, wherein the controller is further configured to:
compare the one or more window motion measurements to a threshold value;
determine whether the one or more window motion measurements are outside of the threshold value; and
upon determining that the one or more window motion measurements are outside of the threshold value:
switch from the sleep mode to the awake mode, regardless of the periodic switching from the sleep mode to the awake mode;
while in the awake mode, communicate, to the electronic device via the wireless transceiver, information indicative of the one or more window motion measurements being outside of the threshold value; and
after communicating the information indicative of the one or more window motion measurements being outside of the threshold value, returning from the awake mode back to the sleep mode.

74. The wireless window motion sensor device of claim 73, wherein the controller is further configured to listen for instructions while in the awake mode, after communicating the information indicative of the one or more window motion measurements being outside of the threshold value, and before returning back to the sleep mode.

75. The wireless window motion sensor device of claim 70, wherein the controller is further configured to cause the wireless device to listen for one or more instructions while operating in the awake mode, and, in response to receiving the one or more instructions, perform one or more functions requested by the one or more instructions while operating in the awake mode.

76. A method for using a wireless security sensor device that functions as part of an in-building wireless sensor system, comprising:
continuously operating the wireless device in a sleep mode such that the wireless transceiver is inoperable to transmit or receive information and consumption of power from the battery is lower than when the wireless device operates in an awake mode;
switching, periodically and temporarily, the operation of the wireless device from the sleep mode to the awake mode;
transmitting, by the wireless transceiver, while in the awake mode, one or more security sensor measurements measured using a security sensor of the wireless device as one or more encrypted packets, each encrypted packet comprising a first checksum and first authenticity code for use in verifying an authenticity of the packet, wherein:
transmission of the one or security sensor measurements are performed using a wireless transceiver capable of wirelessly transmitting and receiving information to and from an electronic device located remotely from the wireless device; and
receiving, by the wireless transceiver, an encrypted message comprising a second checksum and a second authenticity code; and
in response to the received, encrypted message comprising the second checksum and the second authenticity code, altering a period at which the wireless device switches from the sleep mode to the awake mode such that during a first period the wireless device operates in the sleep mode for a first amount of time before temporarily switching from the sleep mode to the awake mode and that during a second period the wireless device operates in the sleep mode for a second amount of time before temporarily switching from the sleep mode to the awake mode, the second amount of time being greater than the first amount of time.

77. The method for using the wireless security sensor device of claim 76, further comprising:
causing the wireless device to remain in the awake mode until it wirelessly receives an acknowledgement that the one or more security sensor measurements were received; and
in response to receiving the acknowledgement that the one or more security sensor measurements were received, causing the wireless device to enter again into the sleep mode.

78. The method for using the wireless security sensor device of claim 76, further comprising:
determining, prior to wirelessly communicating the one or more security sensor measurements, an available radio frequency channel, wherein the one or more security sensor measurements is wireless communicated from the wireless device to the electronic device located remote from the wireless device over the available radio frequency channel.

79. The method for using the wireless security sensor device of claim 78, further comprising:
determining, by the wireless device, that a certain radio frequency channel is in use, and
selecting, by the wireless device, an alternative radio frequency channel that is not in use to wirelessly communicate the information indicative of the sensor data.

80. The method for using the wireless security sensor device of claim 76, wherein transmitting while in the awake mode, the one or more security sensor measurements comprises:
  wirelessly communicating, on the alternative radio frequency channel, the one or more security sensor measurements utilizing spread-spectrum communication techniques; and the method further comprising:
  wirelessly receiving, while in the awake mode and using the spread-spectrum communication techniques, information from the electronic device including instructions regarding subsequent operation of the wireless device.

81. The method for using the wireless security sensor device of claim 76, further comprising:
  comparing, by the wireless device, the one or more security sensor measurements to a threshold value;
  determining, by the wireless device, whether the one or more security sensor measurements are outside of the threshold value; and
  upon determining that the one or more security sensor measurements are outside of the threshold value:
  switching from the sleep mode to the awake mode, regardless of the periodic switching from the sleep mode to the awake mode;
  while in the awake mode, communicating, to the electronic device via the wireless transceiver, information indicative of the one or more security sensor measurements being outside of the threshold value; and
  after communicating the information indicative of the one or more security sensor measurements being outside of the threshold value, returning from the awake mode back to the sleep mode.

82. A method for using a wireless door motion sensor device that functions as part of an in-building wireless sensor system, comprising:
  continuously operating the wireless device in a sleep mode such that the wireless transceiver is inoperable to transmit or receive information and consumption of power from the battery is lower than when the wireless device operates in an awake mode;
  switching, periodically and temporarily, the operation of the wireless device from the sleep mode to the awake mode;
  transmitting, by the wireless transceiver, while in the awake mode, one or more door motion measurements measured using a door motion sensor of the wireless device as one or more encrypted packets, each encrypted packet comprising a first checksum and first authenticity code for use in verifying an authenticity of the packet, wherein:
  transmission of the one or more door motion measurements are performed using a wireless transceiver capable of wirelessly transmitting and receiving information to and from an electronic device located remotely from the wireless device; and
  receiving, by the wireless transceiver, an encrypted message comprising a second checksum and a second authenticity code; and
  in response to the received, encrypted message comprising the second checksum and the second authenticity code, altering a period at which the wireless device switches from the sleep mode to the awake mode such that during a first period the wireless device operates in the sleep mode for a first amount of time before temporarily switching from the sleep mode to the awake mode and that during a second period the wireless device operates in the sleep mode for a second amount of time before temporarily switching from the sleep mode to the awake mode, the second amount of time being greater than the first amount of time.

83. The method for using the wireless door motion sensor device of claim 82, further comprising:
  causing the wireless device to remain in the awake mode until it wirelessly receives an acknowledgement that the one or more door motion measurements were received; and
  in response to receiving the acknowledgement that the one or more door motion measurements were received, causing the wireless device to enter again into the sleep mode.

84. The method for using the wireless door motion sensor device of claim 82, further comprising:
  determining, prior to wirelessly communicating the one or more door motion measurements, an available radio frequency channel, wherein the one or more door motion measurements is wireless communicated from the wireless device to the electronic device located remote from the wireless device over the available radio frequency channel.

85. The method for using the wireless door motion sensor device of claim 84, further comprising:
  determining, by the wireless device, that a certain radio frequency channel is in use, and
  selecting, by the wireless device, an alternative radio frequency channel that is not in use to wirelessly communicate the information indicative of the sensor data.

86. The method for using the wireless door motion sensor device of claim 82, wherein transmitting while in the awake mode, the one or more door motion measurements comprises:
  wirelessly communicating, on the alternative radio frequency channel, the one or more door motion measurements utilizing spread-spectrum communication techniques; and the method further comprising:
  wirelessly receiving, while in the awake mode and using the spread-spectrum communication techniques, information from the electronic device including instructions regarding subsequent operation of the wireless device.

87. The method for using the wireless door motion sensor device of claim 82, further comprising:
  comparing, by the wireless device, the one or more door motion measurements to a threshold value;
  determining, by the wireless device, whether the one or more door motion measurements are outside of the threshold value; and
  upon determining that the one or more door motion measurements are outside of the threshold value:
  switching from the sleep mode to the awake mode, regardless of the periodic switching from the sleep mode to the awake mode;
  while in the awake mode, communicating, to the electronic device via the wireless transceiver, information indicative of the one or more door motion measurements being outside of the threshold value; and
  after communicating the information indicative of the one or more door motion measurements being outside of the threshold value, returning from the awake mode back to the sleep mode.

88. A method for using a wireless window breakage sensor device that functions as part of an in-building wireless sensor system, comprising:
  continuously operating the wireless device in a sleep mode such that the wireless transceiver is inoperable to transmit or receive information and consumption of power from the battery is lower than when the wireless device operates in an awake mode;

switching, periodically and temporarily, the operation of the wireless device from the sleep mode to the awake mode;

transmitting, by the wireless transceiver, while in the awake mode, one or more window breakage measurements measured using a window breakage sensor of the wireless device as one or more encrypted packets, each encrypted packet comprising a first checksum and first authenticity code for use in verifying an authenticity of the packet, wherein:

transmission of the one or more window breakage measurements are performed using a wireless transceiver capable of wirelessly transmitting and receiving information to and from an electronic device located remotely from the wireless device; and receiving, by the wireless transceiver, an encrypted message comprising a second checksum and a second authenticity code; and in response to the received, encrypted message comprising the second checksum and the second authenticity code, altering a period at which the wireless device switches from the sleep mode to the awake mode such that during a first period the wireless device operates in the sleep mode for a first amount of time before temporarily switching from the sleep mode to the awake mode and that during a second period the wireless device operates in the sleep mode for a second amount of time before temporarily switching from the sleep mode to the awake mode, the second amount of time being greater than the first amount of time.

89. The method for using the wireless window breakage sensor device of claim 88, further comprising:

causing the wireless device to remain in the awake mode until it wirelessly receives an acknowledgement that the one or more window breakage measurements were received; and in response to receiving the acknowledgement that the one or more window breakage measurements were received, causing the wireless device to enter again into the sleep mode.

90. The method for using the wireless window breakage sensor device of claim 88, further comprising:

determining, prior to wirelessly communicating the one or more window breakage measurements, an available radio frequency channel, wherein the one or more window breakage measurements is wireless communicated from the wireless device to the electronic device located remote from the wireless device over the available radio frequency channel.

91. The method for using the wireless window breakage sensor device of claim 90, further comprising:

determining, by the wireless device, that a certain radio frequency channel is in use, and selecting, by the wireless device, an alternative radio frequency channel that is not in use to wirelessly communicate the information indicative of the sensor data.

92. The method for using the wireless window breakage sensor device of claim 88, wherein transmitting while in the awake mode, the one or more window breakage measurements comprises:

wirelessly communicating, on the alternative radio frequency channel, the one or more window breakage measurements utilizing spread-spectrum communication techniques; and the method further comprising:

wirelessly receiving, while in the awake mode and using the spread-spectrum communication techniques, information from the electronic device including instructions regarding subsequent operation of the wireless device.

93. The method for using the wireless window breakage sensor device of claim 88, further comprising:

comparing, by the wireless device, the one or more window breakage measurements to a threshold value;

determining, by the wireless device, whether the one or more window breakage measurements are outside of the threshold value; and upon determining that the one or more window breakage measurements are outside of the threshold value:

switching from the sleep mode to the awake mode, regardless of the periodic switching from the sleep mode to the awake mode;

while in the awake mode, communicating, to the electronic device via the wireless transceiver, information indicative of the one or more window breakage measurements being outside of the threshold value; and after communicating the information indicative of the one or more window breakage measurements being outside of the threshold value, returning from the awake mode back to the sleep mode.

94. A method for using a wireless window motion sensor device that functions as part of an in-building wireless sensor system, comprising:

continuously operating the wireless device in a sleep mode such that the wireless transceiver is inoperable to transmit or receive information and consumption of power from the battery is lower than when the wireless device operates in an awake mode;

switching, periodically and temporarily, the operation of the wireless device from the sleep mode to the awake mode;

transmitting, by the wireless transceiver, while in the awake mode, one or more window motion measurements measured using a window motion sensor of the wireless device as one or more encrypted packets, each encrypted packet comprising a first checksum and first authenticity code for use in verifying an authenticity of the packet, wherein:

transmission of the one or more window motion measurements are performed using a wireless transceiver capable of wirelessly transmitting and receiving information to and from an electronic device located remotely from the wireless device; and receiving, by the wireless transceiver, an encrypted message comprising a second checksum and a second authenticity code; and in response to the received, encrypted message comprising the second checksum and the second authenticity code, altering a period at which the wireless device switches from the sleep mode to the awake mode such that during a first period the wireless device operates in the sleep mode for a first amount of time before temporarily switching from the sleep mode to the awake mode and that during a second period the wireless device operates in the sleep mode for a second amount of time before temporarily switching from the sleep mode to the awake mode, the second amount of time being greater than the first amount of time.

95. The method for using the wireless window motion sensor device of claim 94, further comprising:

causing the wireless device to remain in the awake mode until it wirelessly receives an acknowledgement that the one or more window motion measurements were received; and in response to receiving the acknowledgement that the one or more window motion measurements were received, causing the wireless device to enter again into the sleep mode.

96. The method for using the wireless window motion sensor device of claim 94, further comprising:

determining, prior to wirelessly communicating the one or more window motion measurements, an available radio frequency channel, wherein the one or more window motion measurements is wireless communicated from the wireless device to the electronic device located remote from the wireless device over the available radio frequency channel.

97. The method for using the wireless window motion sensor device of claim 96, further comprising:

determining, by the wireless device, that a certain radio frequency channel is in use, and selecting, by the wireless device, an alternative radio frequency channel that is not in use to wirelessly communicate the information indicative of the sensor data.

98. The method for using the wireless window motion sensor device of claim 94, wherein transmitting while in the awake mode, the one or more window motion measurements comprises:

wirelessly communicating, on the alternative radio frequency channel, the one or more window motion measurements utilizing spread-spectrum communication techniques; and the method further comprising:

wirelessly receiving, while in the awake mode and using the spread-spectrum communication techniques, information from the electronic device including instructions regarding subsequent operation of the wireless device.

99. The method for using the wireless window motion sensor device of claim 94, further comprising:

comparing, by the wireless device, the one or more window motion measurements to a threshold value;

determining, by the wireless device, whether the one or more window motion measurements are outside of the threshold value; and upon determining that the one or more window motion measurements are outside of the threshold value:

switching from the sleep mode to the awake mode, regardless of the periodic switching from the sleep mode to the awake mode;

while in the awake mode, communicating, to the electronic device via the wireless transceiver, information indicative of the one or more window motion measurements being outside of the threshold value; and after communicating the information indicative of the one or more window motion measurements being outside of the threshold value, returning from the awake mode back to the sleep mode.

* * * * *